(12) United States Patent
Hayakawa

(10) Patent No.: US 6,963,448 B1
(45) Date of Patent: Nov. 8, 2005

(54) OPTICAL LOW-PASS FILTER, AND IMAGE SENSING UNIT AND APPARATUS USING THE SAME

(75) Inventor: Shingo Hayakawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 09/714,266

(22) Filed: Nov. 17, 2000

(30) Foreign Application Priority Data

Nov. 19, 1999 (JP) ................................. 11-330178
May 22, 2000 (JP) ............................. 2000-150453

(51) Int. Cl.⁷ ............................ G02B 27/28; G02B 5/30
(52) U.S. Cl. ...................... 359/494; 359/497; 359/498
(58) Field of Search ............................... 359/494, 495, 359/497–499, 502; 348/273, 336, 340; 372/20; 349/112

(56) References Cited

U.S. PATENT DOCUMENTS

| | | | |
|---|---|---|---|
| 4,539,584 A | | 9/1985 | Otake |
| 5,175,736 A | * | 12/1992 | Woodward et al. ............ 372/20 |
| 5,471,343 A | * | 11/1995 | Takasugi ..................... 359/494 |
| 5,940,127 A | | 8/1999 | Nakajima |
| 6,075,581 A | * | 6/2000 | Shirochi ..................... 349/112 |
| 6,724,531 B2 | * | 4/2004 | Oono ......................... 359/497 |

FOREIGN PATENT DOCUMENTS

| | | |
|---|---|---|
| DE | 198 26 962 | 3/1999 |
| JP | 47-18688 | 6/1972 |
| JP | 47-18689 | 6/1972 |
| JP | 59-075222 | 4/1984 |
| JP | 60-164719 | 8/1985 |
| JP | 09-211222 | 8/1997 |
| JP | 40921122 A * | 8/1997 |
| JP | 11-218612 | 11/1999 |

OTHER PUBLICATIONS

The Physics Hypertextbook @ http://hypertextbook.com/physics/waves/refraction. © 1998-2004, by Glenn Elert; All Rights Reserved—Fair Using Encouraged.*

* cited by examiner

*Primary Examiner*—Leonidas Boutsikaris
(74) *Attorney, Agent, or Firm*—Fitzpatrick, Cella, Harper & Scinto

(57) ABSTRACT

If the thickness of a birefringence plate that forms an optical low-pass filter is not appropriately set, problems in terms of optical characteristics or machine works are posed. Hence, there is provided an optical low-pass filter which has at least one birefringence plate which is made of a uniaxial single crystal that causes birefringence of incoming rays, has a refractive index difference of 0.02 or more for ordinary and extraordinary rays, and satisfies one of:

$$10° < \theta < 30° \quad (1)$$

$$60° < \theta < 80° \quad (2)$$

where $\theta$ is the angle the optic axis of the birefringence plate makes with the normal to the surface of the birefringence plate.

38 Claims, 15 Drawing Sheets

"3B" VIEW

"3D" VIEW

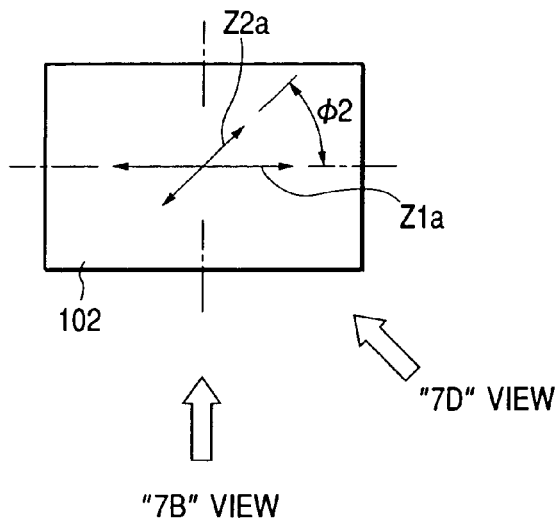
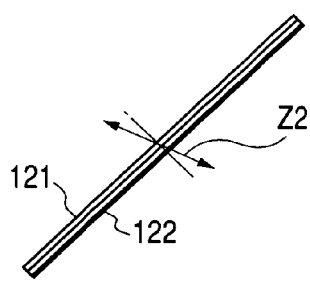
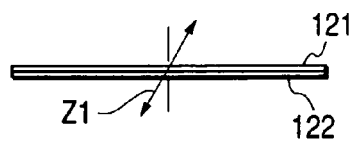
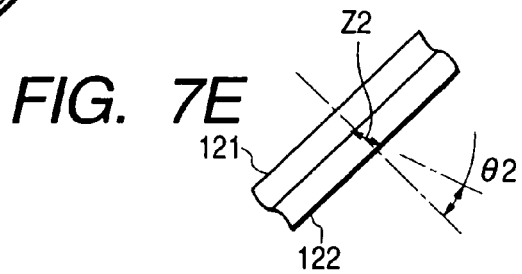
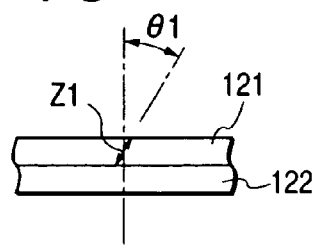

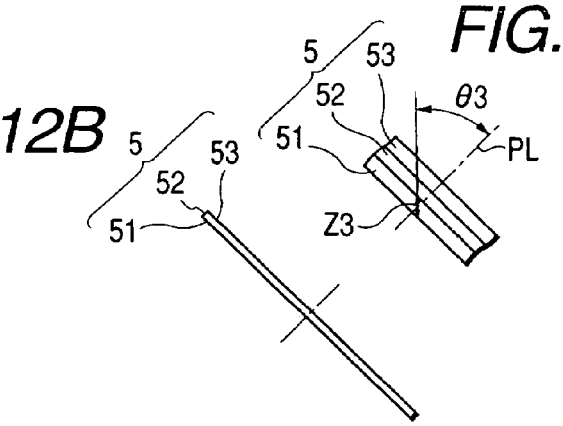
FIG. 12B
FIG. 12C
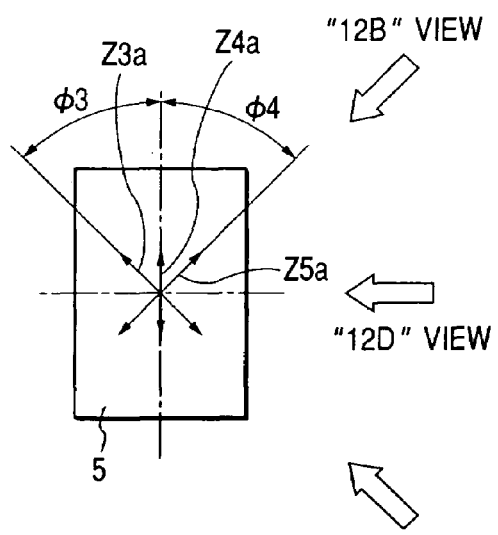
FIG. 12A
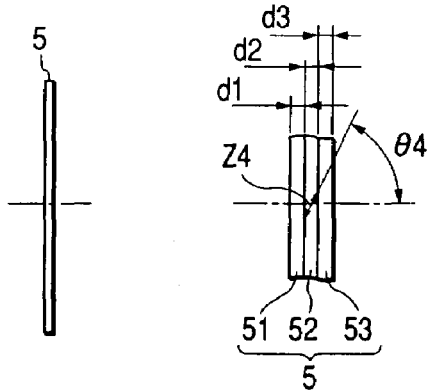
FIG. 12D  FIG. 12E
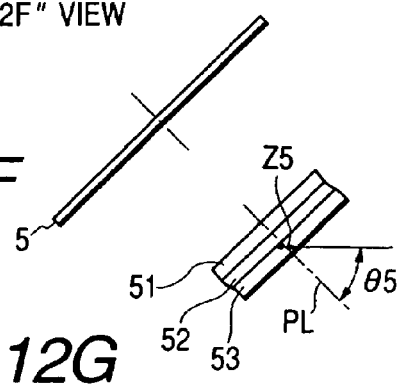
FIG. 12F
FIG. 12G

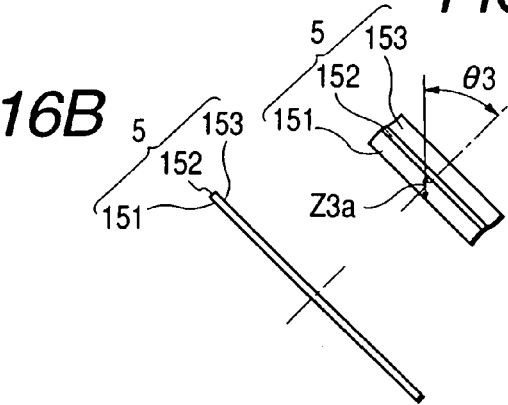
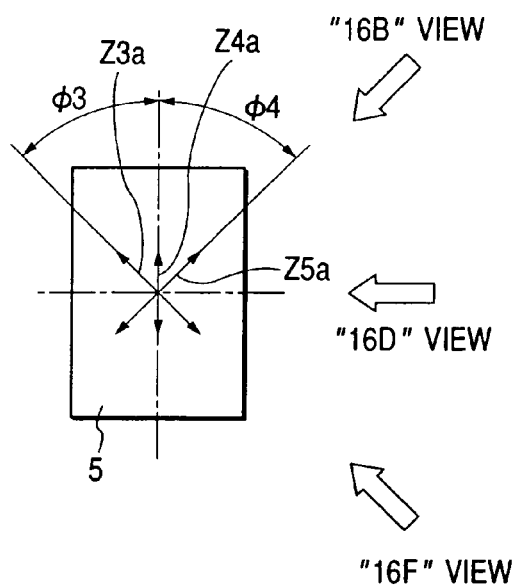
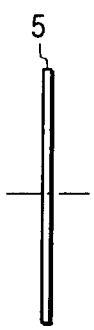
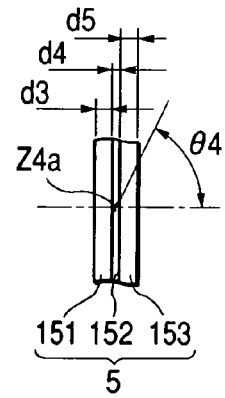
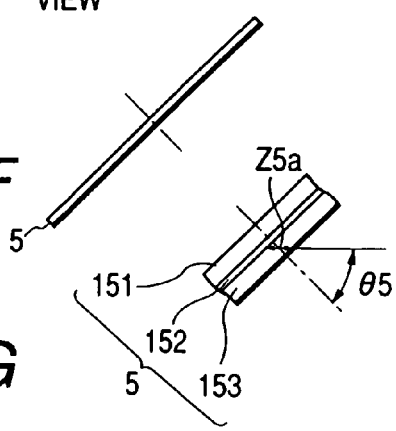

OPTICAL LOW-PASS FILTER, AND IMAGE SENSING UNIT AND APPARATUS USING THE SAME

BACKGROUND OF THE INVENTION

1. Field of the Invention

The present invention relates to an optical low-pass filter and an optical apparatus (image sensing apparatus) using the same and, more particularly, to an optical low-pass filter suitable for a digital still camera, video camera, digital camera, and the like which use a solid-state image sensing element such as a CCD or the like.

2. Related Background Art

Since an image pick-up apparatus such as a digital still camera, video camera, or the like, which uses a two-dimensional solid-state image pick-up element such as a CCD, MOS, or the like, samples an object image at pixel pitches, when an object image having high spatial frequency components is to be sensed, a spurious resolution signal that outputs an aliasing image of high-frequency components as low-frequency components is generated, thus lowering the resolution of an object image. In an image pick-up apparatus which uses a single-plate color solid-state image sensing element as well, upon sensing an object image having high spatial frequency components, a false color signal determined by the layout of a color filter which is set in front of pixels is generated, thus deteriorating the color reproducibility of an object image.

As a conventional means which is inserted in the optical path of an image sensing system to reduce the spurious resolution signal or spurious color signal resulting from high-frequency components of an object image, various optical low-pass filters have been proposed. As the most prevalent one of these optical low-pass filters, an optical low-pass filter which comprises a plane-parallel plate made of a quartz single crystal is known. In general, when the normal to an entrance surface is obliquely set to make a predetermined angle with the optic axis (Z-axis) of a crystal, rays that enter the plane-parallel plate made of quartz as a uniaxial crystal exhibit anisotropy in the Z-axis direction to be separated into ordinary and extraordinary rays, and separated rays parallelly leave the plane-parallel plate. At this time, the separation distance between the ordinary and extraordinary rays is determined by an angle the normal to the entrance surface of the plane-parallel plate makes with the Z-axis of the crystal, and the thickness of the plane-parallel plate.

Optical low-pass filters which utilizes such optical effects of quartz have been proposed in, e.g., Japanese Utility Model Publication Nos. 47-18688 and 47-18689, Japanese Patent Application Laid-Open Nos. 59-75222 and 60-164719, and the like.

Japanese Utility Model Publication Nos. 47-18688 and 47-18689 disclose an arrangement which assumes a stripe-shaped filter as a color filter, and separates rays into ordinary and extraordinary rays using a plane-parallel plate made of, e.g., quartz having birefringence to image them on an image sensing surface so as to reduce a spurious color signal generated when the spatial frequency of an object is synchronized with the color filter. In particular, Utility Model Publication No. 47-18689 discloses an arrangement that cuts out a single crystal of quartz so that its optic axis (Z-axis) makes an angle of around 45° with the entrance and exit surfaces of the plane-parallel plate.

Japanese Patent Application Laid-Open Nos. 59-75222 and 60-164719 disclose an arrangement which assumes a Bayer-matrix filter shown in, e.g., FIG. 5 as a color filter, separates rays into ordinary and extraordinary rays by combining a plurality of birefringence plates to form a plurality of object images which are obtained by separating an object image and are offset by a predetermined pitch, and effectively reduces a spurious resolution signal and spurious color signal generated due to high-frequency components of an object.

An example that uses a single-crystal plate made of a material other than quartz as a birefringence plate is disclosed in Japanese Patent Application Laid-Open Nos. 9-211222, 11-218612, and the like. Japanese Patent Application Laid-Open Nos. 9-211222 and 11-218612 have proposed an optical low-pass filter which uses a plurality of birefringence plates, and forms at least one of these plates using lithium niobate. A single crystal of lithium niobate is a uniaxial crystal like that of quartz but assures a larger difference between the refractive indices of ordinary and extraordinary rays than quartz. For this reason, the thickness of the birefringence plate required for obtaining a predetermined ray separation distance can be decreased.

In the prior art that uses one or a combination of a plurality of birefringence plates of quartz as an optical low-pass filter, since the refractive index difference between ordinary and extraordinary rays is small, the thickness of each birefringence plate must be larger than a given value to assure a predetermined ray separation distance.

In general, when a plane-parallel plate of a uniaxial crystal is prepared so the normal to its entrance surface makes an angle $\theta$ with the optic axis (Z-axis), and circularly polarized light perpendicularly enters the plane-parallel plate, an angle $\phi$ the traveling direction of ordinary rays makes with that of extraordinary rays in the plane-parallel plate is given by:

$$\tan\phi = (n_o^2 - n_e^2)\sin\theta\cos\theta / (n_e^2\cos 2\theta + n_o^2\sin 2\theta) \quad (4)$$

where $n_o$ is the refractive index of ordinary rays, and $n_e$ is that of extraordinary rays.

Equation (4) represents the separation distance between ordinary and extraordinary rays per unit thickness of the birefringence plate, and this value is maximum when $\theta=45°$.

If the quartz single crystal has a refractive index $n_o=1.544$ of ordinary rays and a refractive index $n_e=1.533$ of extraordinary rays for d-lines, $\tan\phi \approx -0.0058$ when $\theta=45°$. Hence, when, for example, a solid-state image sensing element has a pixel pitch Ph= 10 $\mu$m in the long-side direction, and extraordinary rays are offset 10 $\mu$m in this direction by a quartz birefringence plate to remove a spurious resolution signal generated in this direction, the quartz birefringence plate must have a thickness d of at least about 1.7 mm. In this manner, when quartz that assures a small refractive index difference between ordinary and extraordinary rays is used as the birefringence plate, the optical low-pass filter becomes thick, thus posing a problem in terms of space factor.

Furthermore, when a plane-parallel plate is inserted in the optical path of a photographing optical system, the following problems are posed in addition to that of space factor.

Rays which are imaged by an ideal lens and pass through the plane-parallel plate are refracted at refraction angles according to the Snell's refraction law which is known to those who are skilled in the art in accordance with incident angles $\alpha$ into the plane-parallel plate, and leave the plane-parallel plate in a direction parallel to the incoming rays. The prospective focal plane of an ideal lens is determined by the paraxial theory that uses an approximation of $\sin\alpha \approx \alpha$ for the optical length in the plane-parallel plate, and is set at a position offset in the optical axis direction by an amount substituted by an air-converted optical path length d/N which is given using the plate thickness d and refractive index N of the plane-parallel plate. However, when the incident angle of rays that enter the plane-parallel plate increases, and the approximation of $\sin\alpha \approx \alpha$ deviates from the actual value, rays that emerge from the ideal lens cease to form an image on the prospective imaging surface. More specifically, too much spherical aberration occurs on the optical axis, and astigmatism which becomes too much on the meridional image surface with respect to the sagittal image surface is produced in an off-axis region.

FIGS. 10A to 10C are explanatory views for explaining such phenomenon, i.e., ray aberrations which occur in a birefringence plate when an ideal lens having an exit pupil of F2.0 is set at a position 50 mm separated from an ideal image surface, and a quartz birefringence plate made of a 5-mm thick plane-parallel plate having entrance and exit surfaces perpendicular to the optical axis is set at a position between the ideal lens and an ideal image surface. FIG. 10A illustrates an ideal lens 41 having a focal length=50 mm, a 5-mm thick quartz birefringence plate 42, and a prospective focal plane 43 obtained by a paraxial calculation. Also, 10B and 10C respectively indicate neighbor regions of image surfaces having image heights of 0 mm and 20 mm.

Rays which are imaged by the ideal lens 41 and pass through the plane-parallel plate travel to form an image near the prospective focal plane 43, as shown in FIG. 10A. The neighbor regions 10B and 10C of that image plane are illustrated in an enlarged scale, as shown in FIGS. 10B and 10C. That is, the best image surface position at an image height of 0 mm is located, as indicated by 46 in FIG. 10B, and that at an image height of 20 mm is located, as indicated by 47 in FIG. 10C. As a result, spherical aberration becomes too much at the center of the frame, and astigmatism which becomes too much on the meridional image surface is produced on the periphery of the frame.

In this manner, when the plane-parallel plate is inserted between the photographing optical system and its prospective focal plane, the aforementioned ray aberrations are produced. Hence, it is a common practice to design the photographing optical system which must use a plane-parallel plate such as a quartz birefringence plate in consideration of aberrations produced by the plane-parallel plate. However, an image sensing apparatus with an exchangeable photographing optical system (e.g., a single-lens reflex type digital still camera) which can utilize exchangeable lens systems prepared for silver halide cameras as photographing optical systems cannot take such measure.

In a single crystal of lithium niobate as a uniaxial crystal like quartz, if the refractive index $n_o$= 2.300 of ordinary rays and the refractive index $n_e$= 2.215 of extraordinary rays with respect to d-lines, $\tan\phi \approx 0.0376$ when $\theta=45°$.

Assuming that the solid-state image sensing element has a pixel pitch Ph=10 $\mu$m along its long side direction as in the case of quartz, and a lithium niobate birefringence plate shifts extraordinary rays by 10 $\mu$m in this direction to remove a spurious resolution signal generated in that direction, since a lithium niobate single crystal has $\tan\phi \approx 0.0376$, the birefringence plate need only have a thickness d of about 0.27 mm. Compared to the aforementioned case using the quartz single crystal, the thickness of the birefringence plate can be reduced to about 0.16 times, and when the lithium niobate birefringence plate is applied to an image sensing system as an optical low-pass filter, a compact image sensing system can be realized while solving the problem of space factor, and the problem of ray aberrations produced by the plane-parallel plate can be alleviated.

Japanese Patent Application Laid-Open Nos. 9-211222 and 11-218612 pay attention to such features of the lithium niobate single crystal.

Assuming that an image sensing apparatus uses a two-dimensional solid state image sensing element which has a pixel pitch=10 $\mu$m and an aspect ratio=2:3, and has about 2.5 million effective pixels, the number of pixels in the horizontal direction is around 1,950, that in the vertical direction is around 1,300, and the dimensions of the effective pixels of the solid-sate image sensing element are about 19.5 mm (horizontal direction)×13.0 mm (vertical direction). If an optical low-pass filter made of a plane-parallel plate is relatively closely set in front of such solid-state image sensing element, the plane-parallel plate must have dimensions of at least about 21.0 mm (horizontal direction)×14.5 mm (vertical direction) by adding an effective ray region that considers the solid angle of rays which enter the solid-state image sensing element, and a region for holding the plane-parallel plate itself.

On the other hand, when extraordinary rays are to be separated by the pixel pitch=10 $\mu$m in the horizontal direction, if the angle $\theta$ the optic axis (Z-axis) of the lithium niobate single crystal makes with the normal to the entrance surface of the plane-parallel plate is set at 45°, the thickness of the plane-parallel plate is about 0.27 mm, as described above. As disclosed in Japanese Utility Model Publication No. 47-18688, when a plane-parallel plate that separates extraordinary rays in a direction which makes an angle of about 45° with the horizontal line of the frame in consideration of removal of the influence of a spurious signal due to frequency components ½ the pixel pitch is used together, the thickness of this plane-parallel plate is around 0.19 mm. Since the thicknesses of these plane-parallel plates are substantially 1% or less of the diagonal length determined by the aforementioned outer dimensions, these plates easily crack due to insufficient mechanical strength.

Japanese Patent Application Laid-Open Nos. 9-211222 and 11-218612 mentioned above proposed arrangements of optical low-pass filters in which lithium niobate and quartz are adhered. These prior arts can reduce the thickness of the optical low-pass filter compared to that which is made of quartz alone, but the aforementioned problems of space factor and optical performance of the photographing optical system remain unsolved.

A low-pass filter of the present invention assumes use in, e.g., a digital camera, video camera, and the like, and is especially suitable for a single-lens reflex type digital camera which can effectively utilize various exchangeable lenses prepared as those to be mounted on a single-lens reflex camera that uses a silver halide film. For this purpose, when the low-pass filter is designed to have a sufficiently low profile for use in the single-lens reflex type digital camera main body, it must prevent excessive drop of the resolving powers of the exchangeable lenses and must not cause any ghost or flare when it is used in an image sensing system.

Each exchangeable lens for a single-lens reflex camera that uses a silver halide film is designed to assure spaces for a pivotal mirror and a focal plane shutter so as to realize a TTL finder free from any parallax by maintaining a sufficiently large distance (back focus) from the lens surface on the most image side to the focal plane.

In order to realize a single-lens reflex type digital camera that uses a solid-state image sensing element in place of a silver halide film, the image sensing surface of the solid-state image sensing element can be set at a position equivalent to that of the silver halide film. However, as disclosed in the first prior art, when an optical low-pass filter that uses a plurality of quartz birefringence plates is arranged in the camera, it unwantedly interferes with the pivotal mirror and focal plane shutter.

On the other hand, an exchangeable lens for a single-lens reflex camera that uses a silver halide film normally does not assume the presence of any reflecting member between the lens surface on the most image side and the focal plane. That is, when an optical member having a predetermined reflectance or higher with respect to the visible wavelength range is inserted between the photographing optical system and its focal panel, it tends to produce harmful rays such as surface-reflected ghost, flare spot, and the like that decrease the contrast of an object image. Hence, the reflectance of the optical low-pass filter in the visible wavelength range must be sufficiently low.

SUMMARY OF THE INVENTION

It is, therefore, an object of the present invention to provide an optical low-pass filter which has sufficiently high mechanical strength and high optical performance, and does not cause any ghost, flare spot, or the like when it is used in a single-lens reflex type camera.

According to one aspect of the invention, there is provided an optical low-pass filter which comprises at least one birefringence plate which is made of a uniaxial single crystal that causes birefringence of incoming rays and has a refractive index difference of 0.02 or more for ordinary and extraordinary rays, and the filter satisfies at least one of:

$$10° < \theta < 27° \quad (1)$$

$$61° < \theta < 80° \quad (2)$$

where $\theta$ is the angle an optic axis of said at least one birefringence plate makes with a normal to a surface of said at least one birefringence plate.

According to further aspect of the invention, said at least one birefringence plate is made of lithium niobate.

According to further aspect of the invention, the filter has a plurality of plane-parallel plates including said at least one birefringence plate, and when the plurality of plane-parallel plates are adhered, a dielectric thin film having an anti-reflection effect of rays in a visible wavelength range at an interface between an adhesive and the birefringence plate is added to the surface of the birefringence plate.

According to further aspect of the invention, the filter comprises a first birefringence plate made of a uniaxial single crystal and a second birefringence plate made of a uniaxial single crystal, and an orthogonal projection of an optic axis of the first birefringence plate onto an entrance or exit surface and an orthogonal projection of an optic axis of the second birefringence plate onto the entrance or exit surface point to different directions.

According to further aspect of the invention, the orthogonal projection of the optic axis of the first birefringence plate onto the entrance or exit surface and the orthogonal projection of the optic axis of the second birefringence plate onto the entrance or exit surface make substantially 45°.

According to further aspect of the invention, the filter comprises a first birefringence plate made of a uniaxial single crystal, a second birefringence plate made of a uniaxial single crystal and a third birefringence plate made of a uniaxial single crystal, and directions of orthogonal projections of optic axes of the first, second, and third birefringence plates onto an entrance or exit surface are different from each other.

According to further aspect of the invention, the orthogonal projection of the optic axis of the first birefringence plate onto the entrance or exit surface and the orthogonal projection of the optic axis of the second birefringence plate onto the entrance or exit surface make substantially 45°, and the orthogonal projection of the optic axis of the first birefringence plate onto the entrance or exit surface and an orthogonal projection of an optic axis of the third birefringence plate onto the entrance or exit surface make substantially 90°.

According to further aspect of the invention, the first, second, and third birefringence plates are arranged in turn from a light entrance side, and the filter satisfies:

$$D1 \cong D3 > D2$$

where D1, D2, and D3 are respectively the separation distances of the first, second, and third birefringence plates at exit surfaces thereof.

According to further aspect of the invention, the filter satisfies one of:

$$10° < \theta 2 < 27°$$

$$61° < \theta 2 < 80°$$

where $\theta 2$ is the angle the optic axis of the second birefringence plate makes with a normal to an entrance or exit surface of a plane-parallel plate.

According to another aspect of the invention, there is provided an image sensing unit comprising an image sensing element, and an optical low-pass filter set out in the foregoing, and the filter is inserted in an optical path of photographing light guided to the image sensing element, and the filter causes birefringence of the photographing light.

According to further aspect of the invention, the image sensing element and the optical low-pass filter are integrated.

According to further aspect of the invention, the optical low-pass filter unit are adhered to a front surface of a package that encapsulates the image sensing element.

According to further aspect of the invention, the optical low-pass filter is adhered to a front surface of a board on which the image sensing element is mounted and encapsulates the image sensing element.

According to further aspect of the invention, the optical low-pass filter is directly adhered to the image sensing element.

According to further aspect of the invention, the image sensing unit comprises a first birefringence plate made of a uniaxial single crystal, a second birefringence plate made of a uniaxial single crystal, and the image sensing element has a rectangular image sensing surface. An orthogonal projection of an optic axis of the first birefringence plate onto an entrance or exit surface is substantially parallel to a long side of the image sensing surface, and an orthogonal projection of an optic axis of the second birefringence plate makes substantially 45° with the long side of the image sensing surface.

According to further aspect of the invention, the image sensing unit comprises a first birefringence plate made of a uniaxial single crystal, a second birefringence plate made of a uniaxial single crystal and a third birefringence plate made of a uniaxial single crystal. The image sensing element has a rectangular image sensing surface. An orthogonal projection of an optic axis of the first birefringence plate onto an entrance or exit surface makes substantially 45° with a long side of the image sensing surface, an orthogonal projection of an optic axis of the second birefringence plate onto the entrance or exit surface makes substantially 45° with the orthogonal projection of the optic axis of the first birefringence plate onto the entrance or exit surface, and an orthogonal projection of an optic axis of the third birefringence plate onto the entrance or exit surface makes substantially 90° with the orthogonal projection of the optic axis of the first birefringence plate onto the entrance or exit surface.

According to further aspect of the invention, the image sensing element has a rectangular image sensing surface, and the image sensing unit satisfies:

$$0.015 < p/d < 0.045 \quad (3)$$

where d is the thickness of the at least one birefringence plate, and p is the pixel pitch of the image sensing surface in a long side direction.

According to another aspect of the invention, there is provided an image sensing apparatus which comprises an image sensing unit set out in the foregoing and an image sensing optical system for guiding photographing light to the image sensing unit.

According to further aspect of the invention, the image sensing apparatus further comprises a detachable mount.

BRIEF DESCRIPTION OF THE DRAWINGS

FIGS. 7A, 7B, 7C, 7D and 7E are explanatory views of an optical low-pass filter according to the second embodiment of the present invention;

FIGS. 12A, 12B, 12C, 12D, 12E, 12F and 12G are explanatory views of the optical low-pass filter according to the third embodiment of the present invention;

FIGS. 16A, 16B, 16C, 16D, 16E, 16F and 16G are explanatory views of an optical low-pass filter according to the fourth embodiment of the present invention.

DETAILED DESCRIPTION OF THE PREFERRED EMBODIMENTS

An outline of an embodiment of the present invention will be explained below.

An optical low-pass filter of this embodiment is comprised of a birefringence plate inserted in an optical path between a solid-state image sensing element such as a CCD, MOS, or the like, and a photographing optical system. The birefringence plate is made of a uniaxial single crystal such as lithium niobate having a larger refractive index difference between ordinary and extraordinary rays than quartz, and the filter of this embodiment satisfies at least one of:

$$10° < \theta < 27° \quad (1)$$

$$61° < \theta < 80° \quad (2)$$

where θ is the angle the optic axis (Z-axis) of the crystal makes with the normal to the entrance surface of the birefringence plate.

In this embodiment, by appropriately setting the angle the Z-axis of the uniaxial single crystal which forms the birefringence plate makes with the normal to the entrance surface, a plane-parallel plate serving as the birefringence plate can have an appropriate thickness that allows machine works without posing any problem, and can assure a sufficiently high mechanical strength. Since the birefringence plate can be thinner than that using quartz, space efficiency can be made high, and ray aberrations produced due to insertion of the plane-parallel plate can be sufficiently reduced. Hence, an optical low-pass filter which is particularly suitably used for an image sensing apparatus that uses exchangeable lenses prepared for a silver halide camera as photographing optical systems can be realized.

Figure 1:
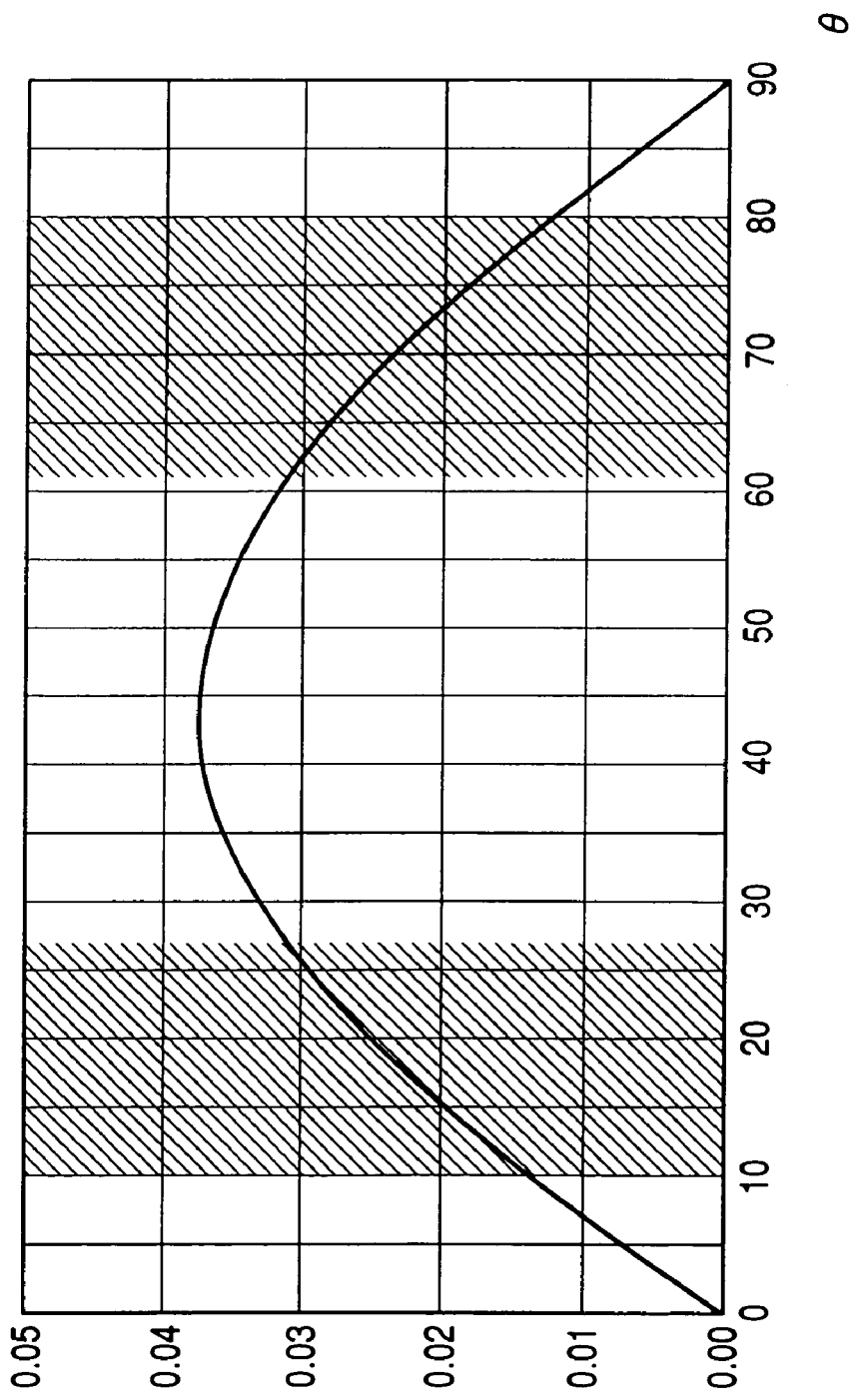
FIG. 1 is a view for explaining the relationship between the angle the optic axis of a lithium niobate single crystal makes with the normal to the entrance and exit surfaces of the plane-parallel plate, and the separation distance between ordinary and extraordinary rays.

Conditional formulas (1) and (2) numerically describe features of the arrangement of the optical low-pass filter of the present invention, and express optical setting ranges of the angle θ the Z-axis of the uniaxial single crystal, such as lithium niobate which has a larger refractive index difference between ordinary and extraordinary rays than quartz, makes with the normal to the entrance surface of the birefringence plate. The ranges specified by formulas (1) and (2) correspond to hatched regions shown in FIG. 1 that shows the relation of equation (4) mentioned above, which expresses the separation distance between ordinary and extraordinary rays per unit thickness of the birefringent plate. When an angle that satisfies conditional formula (1) or (2) is set, the birefringence plate can become 1.2 to 3 times thicker than that when θ=45°.

When the value θ becomes close to 45° beyond the upper limit value of conditional formula (1) or the lower limit value of conditional formula (2), a practical difference from that set at θ= 45° decreases, and the thickness of the birefringence plate becomes too small, resulting in insufficient mechanical strength. Conversely, when the value θ becomes close to 0° beyond the lower limit value of conditional formula (1) or to 90° beyond the upper limit value of conditional formula (2), a change in separation angle of rays with respect to a change in angle the Z-axis of the single crystal makes with the normal to the entrance surface of the plane-parallel plate becomes large, and it is hard to stably work the plane-parallel plate as a birefringence plate that can obtain a desired separation distance.

When the plane-parallel plate is formed of lithium niobate so that the value θ indicates an angle which satisfies the ranges specified by conditional formulas (1) and (2), e.g., when θ=70°, the separation distance between ordinary and extraordinary rays by this plane-parallel plate is 0.0235 mm per mm of the plane-parallel plate. Therefore, the thickness of the plane-parallel plate required for obtaining a separation distance of 10 μm is around 0.43 mm. This thickness is around 1.6 times larger than that obtained when θ=45°, and problems of mechanical strength and machine works can be solved. Compared to the case using quartz with θ=45°, since the plane-parallel plate is about 0.25 times, i.e., has a sufficiently small thickness, the adverse influences on optical performance upon inserting the optical low-pass filter into the optical path can be minimized.

Note that the optical low-pass filter is inserted in the optical path between a photographing optical system 1 and an image sensing element 3, and is formed to have a plane-parallel plate shape by adhering a combination of a plurality of birefringence plates so that their optic axes point to different directions.

The reason why a combination of birefringence plates are adhered so that their optic axes point to different directions is that a plane-parallel plate, which is made of lithium niobate (uniaxial crystal) used as a material of each birefringence plate in this embodiment, is not easy to handle as a single plate since it readily cleaves in a predetermined direction due to a nature of the single crystal. Hence, when a plurality of birefringence plates are adhered so that the optic axes of the single crystals point to different directions, and especially, orthogonal projections of the optic axes of the single crystals onto the entrance surface point to different directions, they become less susceptible to cracking, thus allowing easy handling.

In this case, the orthogonal projections of the optic axes of the single crystals onto the entrance surface agree with the separation direction of extraordinary rays, and it is desirable to appropriately reduce a spurious resolution signal and spurious color signal generated by sampling of the solid-state image sensing element at pixel pitches in both the horizontal and vertical directions, exploiting the separation of rays. For example, in a most prevalent two-dimensional solid-state image sensing element in which pixels each having a nearly square aperture line up at substantially the same pitches in the horizontal and vertical directions, spurious signals generated by high-frequency components in the horizontal, vertical, and oblique 45° directions readily stand out. For this reason, the plurality of birefringence plates preferably include two, birefringence plates, i.e., a first birefringence plate in which the orthogonal projection of the Z-axis of the single crystal onto the entrance surface points to the long side direction of the solid-state image sensing element, and a second birefringence plate in which the orthogonal projection of the Z-axis of the single crystal onto the entrance surface makes 45° with the long side direction of the solid-state image sensing element.

When each of the birefringence plates of the optical low-pass filter, which have separation effects of an object image in predetermined directions, is formed of a lithium niobate single crystal, since the optical low-pass filter can be a sufficiently thin plane-parallel plate within an allowable work range, it can be equipped in a single-lens reflex digital camera main body, and allows use of exchangeable lenses prepared for a silver halide camera without impairing their optical performance.

As described above, in a solid-state image sensing element such as a CCD used in, e.g., a digital camera, it is a common practice to regularly line up individual pixels two-dimensionally, i.e., in the horizontal and vertical directions and, hence, spurious signals generated upon sampling conspicuously appear in these line-up directions. Also, when the horizontal and vertical pitches of the individual pixels are nearly equal to each other, apparent periodicity of pixels is observed in a direction that substantially makes 45° with these two directions, and the resolving power of a predetermined frequency must be lowered in this direction.

Of course, in a special case, i.e., when the individual pixels have considerably different horizontal and vertical pitches, periodicity in the oblique direction is generated at another angle. For this reason, in order to efficiently reduce spurious signals generated when an object having periodicity in these directions in the photographing frame upon using a general solid-state image sensing element, the optical low-pass filter preferably has the aforementioned arrangement.

With this arrangement, the intensity ratio of ordinary rays to extraordinary rays separated by a single birefringence plate becomes 1:1, and the effect of the optical low-pass filter obtained when a stack of a plurality of birefringence plates is used can be uniformed on the entire frame, thus easily realizing a preferable optical low-pass filter.

Assuming that such general solid-state image sensing element is used, a plane-parallel plate obtained by adhering three birefringence plates each made of a lithium niobate single crystal is more preferably used as an optical low-pass filter. When this optical low-pass filter is applied to an optical apparatus, it is inserted in the optical path between a photographing optical system and an image sensing element, and the birefringence plates made of the lithium niobate single crystal are obtained by combining a first birefringence plate in which the orthogonal projection of the optic axis onto the entrance or exit surface of the plane-parallel plate substantially makes an angle of 45° with the long side direction of the image sensing element, a second birefringence plate in which the orthogonal projection of the optic axis onto the entrance or exit surface of the plane-parallel plate substantially makes an angle of 45° with the orthogonal projection of the first birefringence plate, and a third birefringence plate in which the orthogonal projection of the optic axis onto the entrance or exit surface of the plane-parallel plate substantially makes an angle of 90° with the orthogonal projection of the first birefringence plate in the order named.

In this embodiment, if D1, D2, and D3 respectively represent the separation distances between ordinary and extraordinary rays on the exit surfaces of the first, second, and third birefringence plates, a low-profile optical filter is prepared to satisfy:

$$D1 \approx D3 > D2 \tag{5}$$

and an image sensing apparatus which reduces spurious signals in combination with a low-pass filter implemented by a signal process is constructed.

Conditional formula (5) indicates an arrangement in which the separation distances of an object image in two directions that make 45° with the long side direction of the image sensing element are set to be nearly equal to each other (with the range of ±20%), and are set to be larger than the separation distance in the long side direction. As described above, in a single-plate solid-state image sensing element having a general color filter matrix shown in FIG. 5, conspicuous spurious luminance and color signals are generated at a spatial frequency corresponding to the pixel pitch in the long side and short side directions of the image sensing element, and a conspicuous spurious color signal is generated at a spatial frequency corresponding to $1/\sqrt{2}$ that pixel pitch.

The optical low-pass filter with the arrangement which satisfies conditional formula (5) is arranged to reduce a spurious color signal in the oblique direction of these spurious signals, and spurious color signals are reduced by a low-pass filter implemented by a signal process. In this case, it is rather difficult to reduce a spurious luminance signal at a specific spatial frequency in the long side and short side directions of the image sensing element, but an object image can be sensed by fully exploiting the resolving power performance of the photographing optical system. At this time, the second birefringence plate that separates ordinary and extraordinary rays in the long side direction of the image sensing element essentially serves as a phase plate which rotates the phase of rays emanating from this birefringence plate, and as a means for implementing separation of ordinary and extraordinary rays by the third birefringence plate.

At this time, the separation distances D1 and D3 between ordinary and extraordinary rays by the first and second birefringence plates are preferably set to satisfy:

$$D1 \approx D3 \approx P/\sqrt{2}$$

where P is the pixel pitch. The separation distance D2 between ordinary and extraordinary rays by the second birefringence plate is preferably set to satisfy:

$$D2 \leq P/\sqrt{2}$$

Note that substantially equal means within +20%.

However, in practice, it is a common practice to set the separation distances D1 and D3 to be slightly smaller than $P/\sqrt{2}$ upon relative comparison between the resolving power drop of a photographed image and the reduction effect of spurious signals, and D2 should be set in consideration of difficulty of machine work and the like.

Since the second birefringence plate essentially serves as a phase plate by decreasing its separation distance with respect to the first and third birefringence plates so as to satisfy conditional formula (5), as described above, it need only have a manufacturable thickness, and an effect of converting the direction of polarization.

Also, the optical low-pass filter of this embodiment can also be used as a protection plate of the image sensing element. For example, in a solid-state image sensing element which constructs an image sensing unit by encapsulating its image sensing portion in a package, the image sensing portion can be protected by adhering the optical low-pass filter of this embodiment to the front surface of the package. On the other hand, in a solid-state image sensing element which constructs a solid-state image sensing unit by bonding an image sensing portion on a board, the optical low-pass filter of this embodiment is bonded to the front surface of the board on which the image sensing portion is mounted using its outer circumferential portion to encapsulate and protect the image sensing portion.

In an image sensing apparatus that uses a solid-state image sensing element, an infrared cut filter is normally inserted in the optical path for the purpose of correcting the difference between spectral sensitivity of the image sensing element and visual sensitivity. Hence, when a dichroic filter which is made of a multilayered dielectric film and reflects light in the infrared wavelength range is used together in place of a color glass filter that absorbs light in the infrared wavelength range, the need for a glass plate as an infrared cut filter can be obviated, and a size reduction can be achieved. At this time, it is more effective for a size reduction of the system to deposit the multilayered dielectric film on at least one surface of the birefringence plate of a lithium niobate single crystal.

In the image sensing apparatus of this embodiment, the optical low-pass filter includes a birefringence plate which has an effect of separating an object image in the long side direction of the two-dimensional solid-state image sensing element, and satisfies:

$$0.015 < p/d < 0.045 \tag{3}$$

where d is the thickness of the birefringence plate, and p is the pixel pitch of the solid-state image sensing element in its long side direction.

Conditional formula (3) specifies the relationship between the pixel pitch in the horizontal direction which becomes a cause of generation of a spurious resolution signal and a spurious color signal, and the thickness of the birefringence plate of the uniaxial crystal, which has an effect of separating rays in the horizontal direction. If the arrangement satisfies conditional formula (3), the ratio of the outer dimensions and thickness of the birefringence plate is appropriately set in practice under an assumption of a solid-state image sensing element having a predetermined number of pixels, the problem related to machine work can be solved easily, and the problem related to handling can be reduced.

Upon adhering the plurality of birefringence plates of the lithium niobate single crystals to each other, when a dielectric thin film having an anti-reflection effect of rays in the visible wavelength range at the interface of an adhesive and the birefringence plate is added, a preferred embodiment in terms of a reduction of ghost and flare can be realized.

This is because the refractive index of ordinary rays of the lithium niobate single crystal for d-lines is $n_o=2.300$, which is higher than those of quartz and optical glass and, hence, the reflectance at the interface tends to be high. For this reason, if the surface of the single crystal is exposed, reflected light may considerably impair image quality as flare. For example, optical glass having a refractive index of around 1.6 exhibits a reflectance of around 5.3% at an interface with air, and exhibits a reflectance of around 1.0% at an interface with an adhesive having a refractive index of around 1.5. By contrast, the lithium niobate exhibits a reflectance of around 15.5% at an interface with air, and a reflectance of around 4.4% at an interface with an adhesive having a refractive index of around 1.5.

In this manner, since the lithium niobate single crystal has a reflectance of rays in the visible wavelength range, if it is inserted in the optical path without adding any anti-reflection film (e.g., a dielectric thin film), it produces ghost and flare, resulting in a contrast drop of a photographed image. For this reason, an anti-reflection treatment is preferably done at an interface with air.

When the lithium niobate single crystals are adhered to each other, if the refractive index of an adhesive is set to be substantially equal to that of the lithium niobate single crystal, the reflectance at the interface with the adhesive can be decreased. However, no transparent adhesive with such high refractive index is available currently.

Hence, in a preferred embodiment of the optical low-pass filter that uses the lithium niobate single crystal, upon adhering the plurality of birefringence plates, an anti-reflection film is preferably added to the interface with an adhesive. In this case, the anti-reflection film preferably uses a dielectric which has an intermediate refractive index between those of the lithium niobate single crystal and adhesive by setting its optical film thickness to be ¼ the center wavelength of the visible wavelength range. If no dielectric thin film material having an appropriate refractive index is available, an anti-reflection film multilayer in which individual optical film thicknesses are appropriately set is preferably added.

In this manner, an optical low pass filter, which is inserted between a photographing optical system and solid-state image sensing element for the purpose of reductions of any spurious resolution signal and spurious color signal produced due to high-frequency components of an object image in an image sensing apparatus which uses a two-dimensional solid-state image sensing element such as a CCD, MOS, or the like, is prepared by adhering birefringence plates, each of which has an appropriate thickness and is made of a lithium niobate single crystal, to each other, thus realizing a preferred optical low-pass filter. Especially, a single-lens reflex digital still camera which can satisfactorily use exchangeable lens systems for a silver halide camera is realized.

Figure 5:
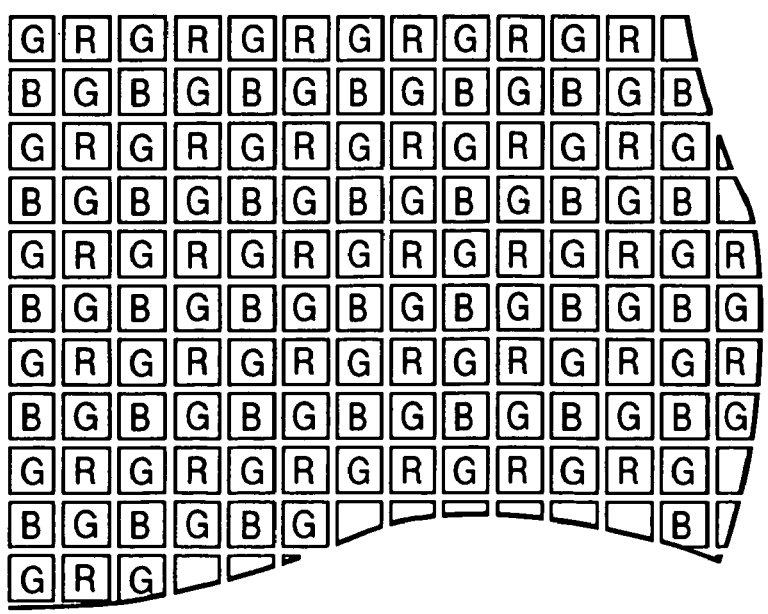
FIG. 5 is an explanatory view of a color filter matrix used on an image sensing element.

Practical embodiments of an image sensing apparatus to which an optical low-pass filter of the present invention is applied will be explained below. An image sensing element 3 which is commonly used in image sensing apparatuses in all embodiments is a solid-state image sensing element in which each pixel has a 10-$\mu m^2$ square shape, has a color filter matrix defined by a repetitive pattern shown in FIG. 5 in front of pixels, and uses 1,950 pixels in the horizontal direction and 1,300 pixels in the vertical direction, thus constructing a two-dimensional color solid-state image sensing element having 2.5 million effective pixels or more. In FIG. 5, G, B, and R respectively indicate color filters which transmit green, blue, and red light components.

First Embodiment

Figure 2:
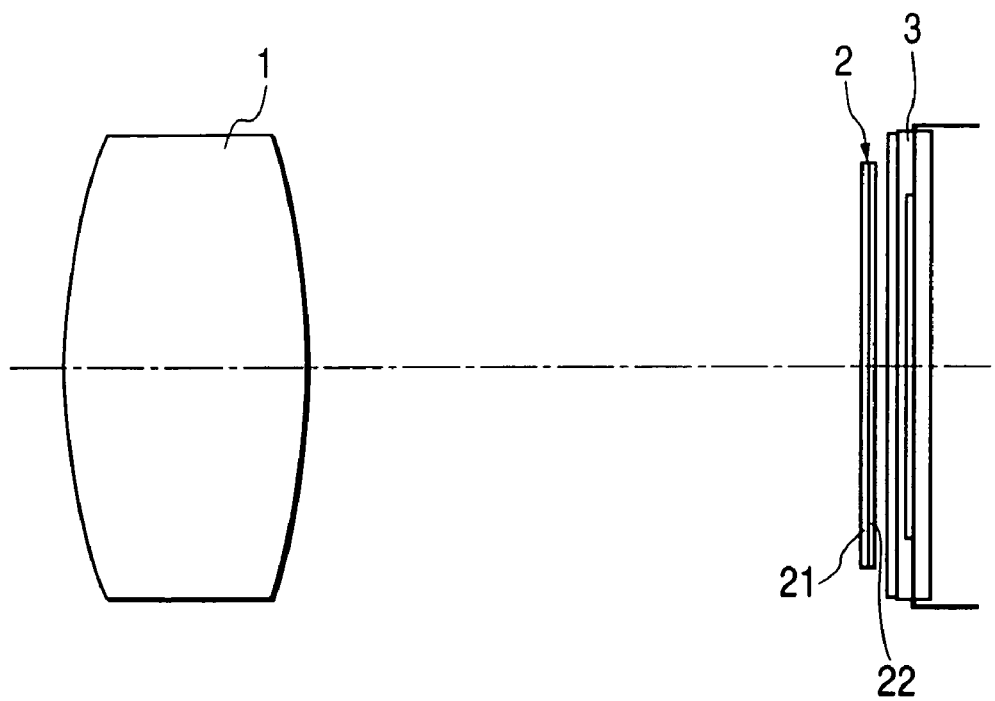
FIG. 2 is a schematic sectional view of an image sensing system when an optical low-pass filter according to the first embodiment of the present invention is mounted in a single-lens reflex camera.

FIG. 2 is a schematic sectional view of an image sensing system when an optical low-pass filter of this embodiment is mounted in a single-lens reflex digital still camera. In FIG. 2, an exchangeable photographing lens (photographing optical system) 1 has a mount which is commonized so that exchangeable lenses for a silver halide camera can be used. An optical low-pass filter 2 is made of a plane-parallel plate obtained by adhering two birefringence plates (21 and 22 in FIG. 2) formed of a lithium niobate single crystal. In the camera of this embodiment, the optical low-pass filter 2 is inserted immediately before a solid-state image sensing element 3, and separates an object image into four images by the effect of the two birefringence plates 21 and 22.

Figure 3A:
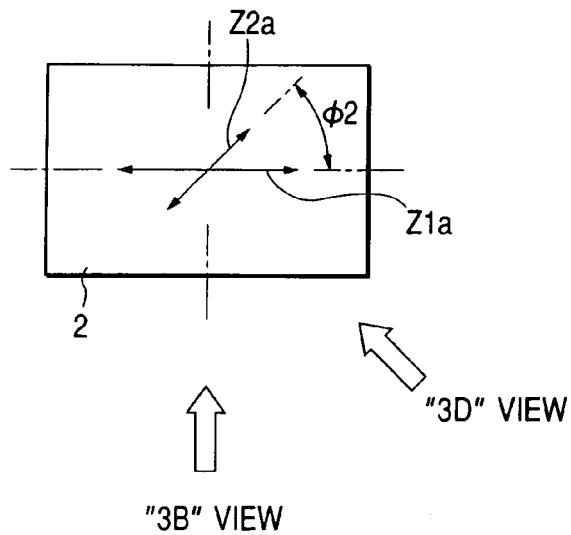
FIGS. 3A, 3B, 3C, 3D and 3E are explanatory views of the optical low-pass filter of the first embodiment.

FIGS. 3A to 3E are explanatory views of the birefringence plates 21 and 22 which are made of a lithium niobate single crystal, and form the optical low-pass filter 2 of this embodiment shown in FIG. 2. The optical low-pass filter 2 of this embodiment is formed by adhering the two birefringence plates 21 and 22 made of a lithium niobate single crystal. FIG. 3A shows the optical low-pass filter 2 viewed from the optical axis direction of the photographing lens 1, and z1a and z2a respectively represent orthogonal projections of the optic axes (Z-axes) of the birefringence plates 21 and 22. As shown in FIG. 3A, the orthogonal projection z1a of the Z-axis of the birefringence plate 21 agrees with (parallel to) the long side direction of the optical low-pass filter 2, and the orthogonal projection z2a of the Z-axis of the birefringence plate 22 makes an angle $\phi 2$ with the long side of the optical low-pass filter 2. In this embodiment, $\phi 2=45°$.

The size of the optical low-pass filter 2 is determined in consideration of the solid angle of rays coming from the photographing lens 1 and a holder for the optical low-pass filter 2 itself in addition to the dimensions of the effective pixel region of the image sensing element 3. In this embodiment, the optical low-pass filter 2 has a size larger than the effective pixel region of the image sensing element 3. The long side direction of the optical low-pass filter 2 substantially agrees with that of the image sensing element.

Figure 3D:
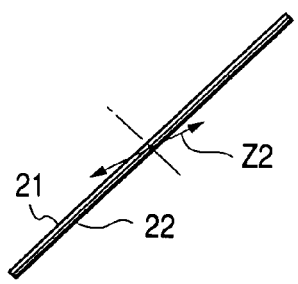
Figure 3B:
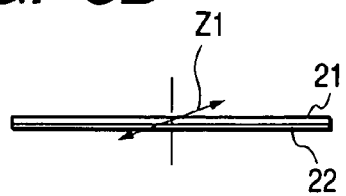
Figure 3E:
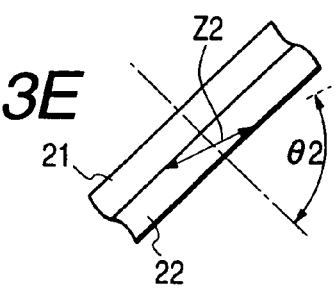
Figure 3C:
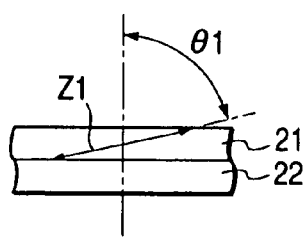

FIG. 3B shows the optical low-pass filter 2 of this embodiment viewed from a "3B" view direction in FIG. 3A, and FIG. 3C is a partially enlarged view of FIG. 3B. In FIGS. 3B and 3C, z1 represents the Z-axis of the birefringence plate 21, and the Z-axis z1 of the birefringence plate 21 and the normal to the entrance/exit surface of the optical low-pass filter make an angle $\theta 1$, as shown in FIG. 3C. In this embodiment, $\theta 1=75°$. FIG. 3D shows the optical low-pass filter 2 of this embodiment viewed from a "3D" view direction in FIG. 3A, and FIG. 3E is a partially enlarged view of FIG. 3D. In FIGS. 3D and 3E, z2 represents the Z-axis of the birefringence plate 22, and the Z-axis z2 of the birefringence plate 22 and the normal to the entrance/exit surface of the optical low-pass filter make an angle $\theta 2$, as shown in FIG. 3E. In this embodiment, $\theta 2=75°$. Furthermore, thicknesses d1 and d2 of the birefringence plates 21 and 22 are respectively d1=0.45 mm and d2=0.30 mm.

Figure 4:
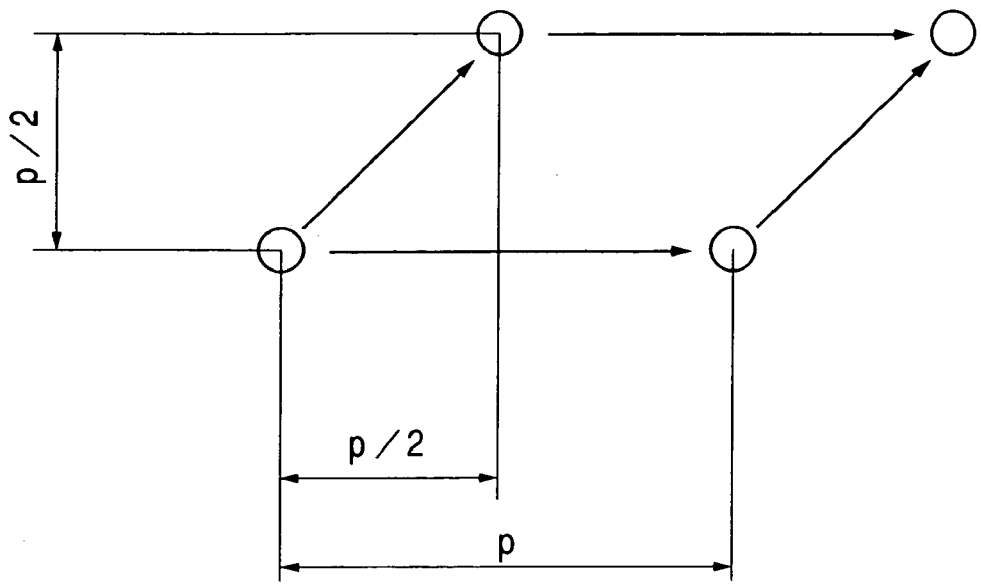
FIG. 4 is an explanatory view showing the separation process of an object image by ordinary and extraordinary rays.

In this embodiment, since the birefringence plates 21 and 22 are arranged in this manner, extraordinary rays are imaged to be offset from ordinary rays by around 10 $\mu$m in the horizontal direction (long side direction) and around 7 $\mu$m in the oblique 45° direction with respect to the horizontal direction, thus separating an object image into four images. FIG. 4 shows the separation process of the object image. In FIG. 4, p indicates the pixel pitch of the image sensing element 3 in the long side direction (horizontal direction).

In this embodiment, the relationship between the thickness d of the birefringence plate 21 which has an effect of separating an object image in the long side direction of the solid-state image sensing element 3, and the pixel pitch p of the solid-state image sensing element 3 in the long side direction is given by:

$$p/d=0.022$$

and satisfies conditional formula (3) mentioned above.

In a solid-state image sensing element in which square pixels having color filters shown in FIG. 5 are two-dimensionally arranged, it is known that moiré is generated in an object image having a spatial frequency $n/p$ (n is an integer) and a spurious color signal is generated in an object image having a spatial frequency $(2n-1)/2p$ in the line-up directions of pixels, i.e., in the horizontal and vertical directions. Also, since pixels have periodicity in the oblique 45° direction, it is known that a spurious color signal is generated in an object image having a spatial frequency $(2n-1)/\sqrt{2}p$. For this reason, an optical low-pass filter which controls MTF values at least at these spatial frequencies to be low is required.

In the optical low-pass filter of this embodiment, in order to efficiently reduce a spurious resolution signal and spurious color signal generated based on the color filter matrix shown in FIG. 5 and the sampling pitch p of pixels, the birefringence plate 21 separates extraordinary rays by p in the horizontal direction, and the birefringence plate 22 separates extraordinary rays by p/√2 in the oblique 45° direction, thus separating the object image into four images, as shown in FIG. 4. Since this embodiment assumes an image sensing element having a pixel pitch=10 µm, the birefringence plate 21 separates an image by around 10 µm, which is the same as the pixel pitch, in the horizontal direction to mainly reduce the moiré, and the birefringence plate 22 separates an image by an amount nearly half (about 7 µm) the pixel pitch in the oblique 45° direction to mainly reduce the spurious color signal.

In this embodiment, since the two birefringence plates 21 and 22 are used, an optical low-pass filter which suppresses MTF values of high spatial frequencies equal to or higher than a cutoff frequency=½p determined by the pixel pitch p to reduce generation of any spurious resolution signal and spurious color signal is efficiently formed.

Figure 6A:
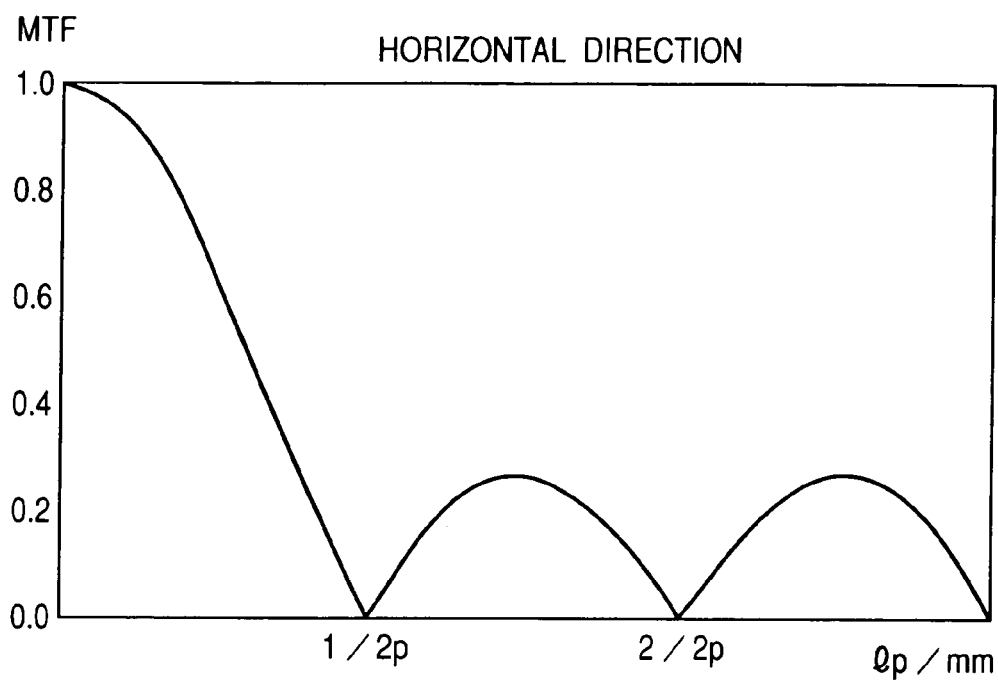
FIGS. 6A and 6B are explanatory views showing the spatial frequency characteristics of the optical low-pass filter of the first embodiment.
Figure 6B:
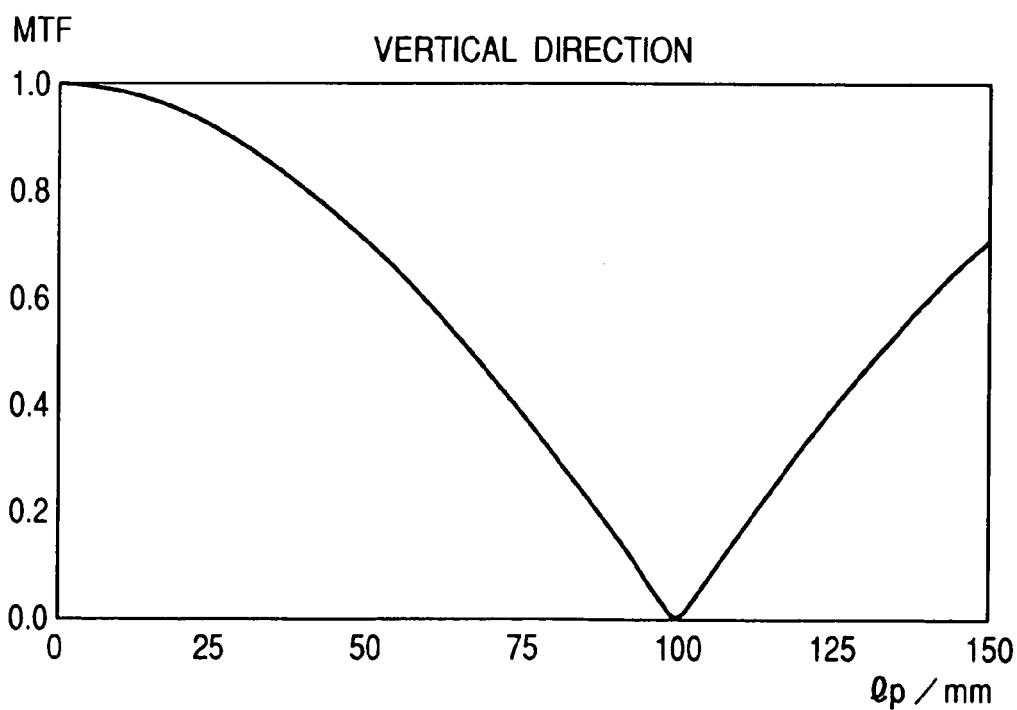

FIGS. 6A and 6B show the spatial frequency characteristics of the optical low-pass filter of this embodiment. FIGS. 6A and 6B respectively shows the characteristics in the horizontal direction (the long side direction of the image sensing element) and in the vertical direction (the short side direction of the image sensing element).

Second Embodiment

FIGS. 7A to 7E are explanatory views of birefringence plates 121 and 122 which are made of a lithium niobate single crystal, and form an optical low-pass filter 102 of the second embodiment. The optical low-pass filter 102 of this embodiment is inserted in the optical path between the photographing lens 1 and solid-state image sensing element 3 as in the image sensing system shown in FIG. 1 when it is used, and is functionally equivalent to the optical low-pass filter 2 of the first embodiment. Differences from the optical low-pass filter 2 of the first embodiment will be explained below.

FIG. 7A shows the optical low-pass filter 102 viewed from the optical axis direction of the photographing lens 1, and z1a and z2a respectively represent orthogonal projections of the optic axes (Z-axes) of the birefringence plates 121 and 122. As shown in FIG. 7A, in this embodiment the orthogonal projection z1a of the Z-axis of the birefringence plate 121 agrees with (parallel to) the long side direction of the optical low-pass filter 102, and the orthogonal projection z2a of the Z-axis of the birefringence plate 122 makes an angle ϕ2 with the long side of the optical low-pass filter 102. In this embodiment as well, ϕ2= 45°.

In this embodiment, the size of the optical low-pass filter 102 is larger than the effective pixel region of the image sensing element 3 as in the optical imaged to be offset from ordinary rays by around 10 µm in the horizontal direction and around 7 µm in the oblique 45° direction, thus separating an object image into four images.

In this embodiment, the angle e the Z-axis of the lithium niobate single crystal that forms the birefringence plate makes with the normal to the entrance/exit surface of the optical low-pass filter is different from that in the first embodiment. By appropriately setting the angle θ within the range in which conditional formula (1) or (2) holds, a sufficiently low-profile optical low-pass filter which can overcome the problems related to machine work and handling can be realized as in the first embodiment.

Third Embodiment

Figure 11:
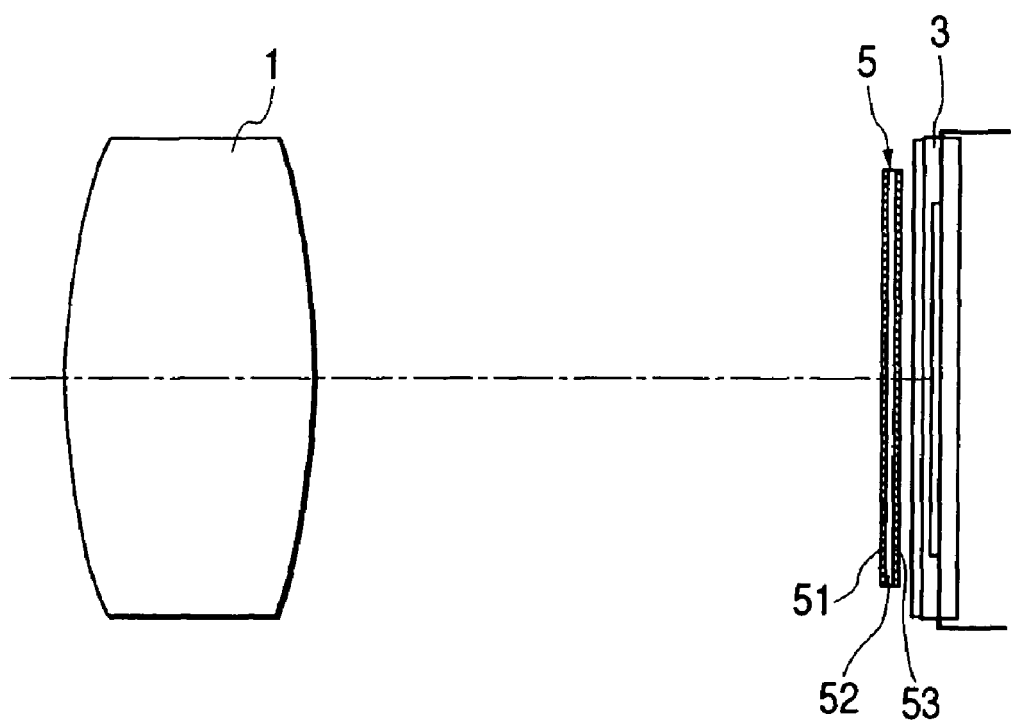
FIG. 11 is a schematic sectional view of an image sensing system when an optical low-pass filter according to the third embodiment of the present invention is mounted in a single-lens reflex camera.

FIG. 11 is a schematic view showing principal part of an optical apparatus having an optical low-pass filter of the third embodiment. This embodiment exemplifies an image sensing apparatus which mounts the optical low-pass filter. In FIG. 11, a photographing lens (photographing optical system) 1 has a mount which is commonized so that exchangeable lenses for a silver halide camera can be used. An optical low-pass filter is made of a plane-parallel plate obtained by adhering a plurality of (three in this embodiment) birefringence plates (51, 52, and 53 in FIG. 11) formed of a lithium niobate single crystal. In the camera of low-pass filter 2 of the first embodiment. Note that the long side direction of the optical low-pass filter 102 substantially agrees with that of the image sensing element.

FIG. 7B shows the optical low-pass filter 102 of this embodiment viewed from a "7B" view direction in FIG. 7A, and FIG. 7C is a partially enlarged view of FIG. 7B. In FIGS. 7B and 7C, z1 represents the Z-axis of the birefringence plate 121, and the Z-axis z1 of the birefringence plate 121 and the normal to the entrance/exit surface of the optical low-pass filter 102 make an angle θ1, as shown in FIG. 7C. In this embodiment, θ1=15°. FIG. 7D shows the optical low-pass filter 102 of this embodiment viewed from a "7D" view direction in FIG. 7A, and FIG. 7E is a partially enlarged view of FIG. 7D. In FIGS. 7D and 7E, z2 represents the Z-axis of the birefringence plate 122, and the Z-axis z2 of the birefringence plate 122 and the normal to the entrance/exit surface of the optical low-pass filter 102 make an angle θ2, as shown in FIG. 7E. In this embodiment, θ2=35°. Furthermore, thicknesses d1 and d2 of the birefringence plates 121 and 122 are respectively d1=0.30 mm and d2= 0.30 mm.

In the optical low-pass filter 102 of this embodiment, since the birefringence plates 121 and 122 are arranged in this manner, extraordinary rays are this embodiment, the optical low-pass filter 5 is inserted immediately before a solid-state image sensing element 3, and separates an object image into eight images by the effect of the three birefringence plates 51, 52, and 53.

FIGS. 12A to 12G are explanatory views of the three birefringence plates 51, 52, and 53 which are made of a lithium niobate single crystal and form the optical low-pass filter 5 shown in FIG. 11. The optical low-pass filter 5 of this embodiment is formed by adhering the three birefringence plates 51, 52, and 53 which are made of a lithium niobate single crystal. FIG. 12A shows the optical low-pass filter 5 viewed from the optical axis direction of the photographing lens 1, and z3a, z4a, and z5a respectively represent orthogonal projections of the optic axes (Z-axes) of the birefringence plates 51, 52, and 53 onto the entrance or exit surface of the plane-parallel plate.

As shown in FIG. 12A, in this embodiment the orthogonal projection z3a of the Z-axis of the birefringence plate 51 points to a direction that makes an angle ϕ3 with the long side of the optical low-pass filter 5, the orthogonal projection z4a of the Z-axis of the birefringence plate 52 agrees with (parallel to) the long side direction of the optical low-pass filter 5, and the orthogonal projection z5a of the Z-axis of the birefringence plate 53 points to a direction that makes an angle φ4 with the long side of the optical low-pass filter 5. In this embodiment, φ3=+45°, and φ4=−45°.

The size of the optical low-pass filter 5 is determined in consideration of the solid angle of rays coming from the photographing lens 1 and a holder for the optical low-pass filter 5 itself in addition to the dimensions of the effective pixel region of the image sensing element 3. In this embodiment, the optical low-pass filter 5 has a size larger than the effective pixel region of the image sensing element 3. The long side direction of the optical low-pass filter 5 substantially agrees with that of the image sensing element.

FIG. 12B shows the optical low-pass filter 5 of this embodiment viewed from a "12B" view direction in FIG. 12A, and FIG. 12C is a partially enlarged view of FIG. 12B. In FIGS. 12B and 12C, z3 represents the Z-axis of the birefringence plate 51, and the Z-axis z3 of the birefringence plate 51 and a normal PL to the entrance/exit surface of the optical low-pass filter 5 make an angle θ3, as shown in FIG. 12C.

In this embodiment, θ3=45°. FIG. 12D shows the optical low-pass filter 5 of this embodiment viewed from a "12D" view direction in FIG. 12A, and FIG. 12E is a partially enlarged view of FIG. 12D. In FIGS. 12D and 12E, z4 represents the Z-axis of the birefringence plate 52, and the Z-axis z4 of the birefringence plate 52 and the normal PL to the entrance/exit surface of the optical low-pass filter 5 make an angle θ4, as shown in FIG. 12E. In this embodiment, θ4=65°.

FIG. 12F shows the optical low-pass filter 5 of this embodiment viewed from a "12F" view direction in FIG. 12A, and FIG. 12G is a partially enlarged view of FIG. 12F. In FIGS. 12F and 12G, z5 represents the Z-axis of the birefringence plate 53, and the Z-axis z5 of the birefringence plate 53 and the normal PL to the entrance/exit surface of the optical low-pass filter 5 make an angle θ5, as shown in FIG. 12G. In this embodiment, θ5=45°. Furthermore, thicknesses d3, d4, and d5 of the birefringence plates 51, 52, and 53 are respectively d3=0.19 mm, d4=0.19 mm, and d5=0.19 mm, i.e., these birefringence plates are sufficiently thin within a workable range.

Figure 13:
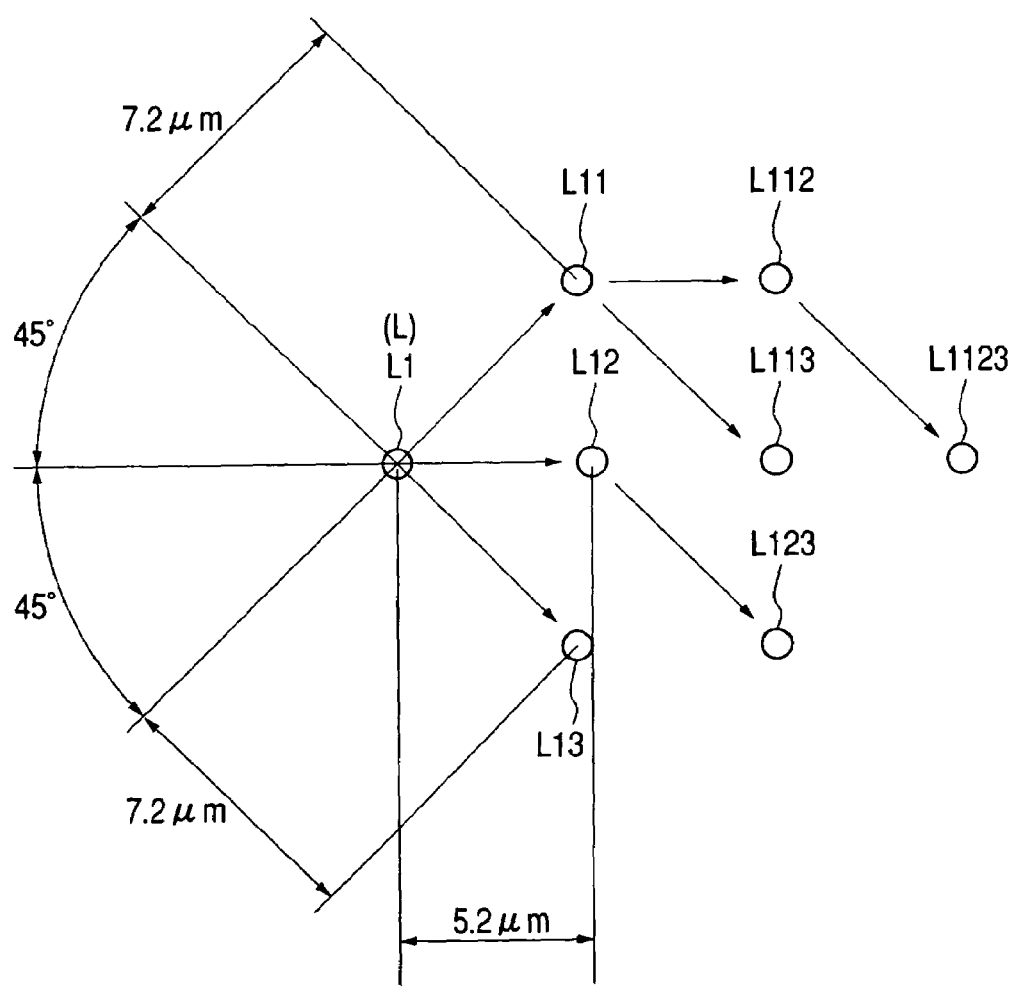
FIG. 13 is an explanatory view of an object image separated by the optical low-pass filter according to the third embodiment of the present invention.

In this embodiment, since the birefringence plates 51, 52, and 53 are arranged in this way, extraordinary rays are imaged to be offset from ordinary rays by about 7.2 μm in the upper oblique 45° direction with respect to the horizontal direction, about 5.4 μm in the horizontal direction (long side direction), and about 7.2 μm in the lower oblique 45° direction with respect to the horizontal direction, thus separating an object image into a total of eight images. FIG. 13 shows the separation process of the object image.

Referring to FIG. 13, the first birefringence plate 51 separates an incoming light beam into light beams L1 and L11. The second birefringence plate 52 separates the light beam L1 into light beams L1 and L12, and the light beam L11 into light beams L11 and L112.

The third birefringence plate 53 separates the light beam L1 into light beams L1 and L13, a light beam L2 into light beams L12 and L123, the light beam L11 into light beams L11 and L113, and the light beam L112 into light beams L112 and L1123.

In this way, the single light beam L is separated into eight light beams as a whole.

In a solid-state image sensing element in which square pixels having color filters shown in FIG. 5 are two-dimensionally arranged, it is known that moiré is generated in an object image having a spatial frequency n/p (p is the sampling pitch of pixels, and n is an integer) and a spurious color signal is generated in an object image having a spatial frequency (2n−1)/2p in the line-up directions of pixels, i.e., in the horizontal and vertical directions. Also, since pixels have periodicity in the oblique 45° direction, it is known that a spurious color signal is generated in an object image having a spatial frequency $(2n-1)/\sqrt{2}p$. For this reason, an optical low-pass filter which controls MTF values at least at these spatial frequencies to be low is required.

In the optical low-pass filter of this embodiment, in order to efficiently reduce a spurious resolution signal and spurious color signal generated based on the color filter matrix shown in FIG. 5 and the sampling pitch p of pixels, the first birefringence plate 51 separates extraordinary rays by substantially $2/\sqrt{p}$ in the upper oblique 45° direction with respect to the horizontal direction, the second birefringence plate 52 separates extraordinary rays by substantially p/2 in the horizontal direction, and the third birefringence plate 53 separates extraordinary rays by substantially $2/\sqrt{p}$ in the lower oblique 45° direction with respect to the horizontal direction, thus separating the object image into eight images as a whole, as shown in FIG. 13. Since this embodiment assumes an image sensing element having a pixel pitch=10 μm, the first birefringence plate 51 separates an image in the upper oblique 45° direction with respect to the horizontal direction by around 7.2 μm, i.e., a distance nearly half a pixel pitch=$10 \times \sqrt{2}$ μm in that direction so as to mainly reduce the spurious color signal, the second birefringence plate 52 rotates the phases of individual point images while separating an image by around 5.2 μm, i.e., a distance nearly half the pixel pitch=10 μm, in the horizontal direction, and the third birefringence plate 53 separates an image in the lower oblique 45° direction with respect to the horizontal direction by around 7.2 μm, i.e., a distance nearly half a pixel pitch=$10 \times \sqrt{2}$ μm in that direction so as to mainly reduce the spurious color signal.

Using the three birefringence plates 51, 52, and 53, the optical low-pass filter of this embodiment suppresses MTF values of high spatial frequencies equal to or higher than a spatial frequency=$\sqrt{2}/p$ so as to reduce any spurious color signal generated upon photographing an object having high-frequency components, which are determined by the pixel pitch p and are arranged to have an angle of substantially 45° with respect to the horizontal direction of the photographing frame. Note that magenta spurious signals are generated as the spurious color signal in the line-up directions of pixels, i.e., the horizontal and vertical directions at a spatial frequency=1/p determined by the pixel pitch p. However, when the optical low-pass filter is arranged to remove the spurious color signals generated in these directions, the contrast of the high-frequency components inevitably drops, and an adverse influence such as lack of resolving power of a photographed image appears. Hence, in this embodiment, spurious color signals generated in these directions are processed to lower their MTF values alone by adding a low-pass filter implemented by a signal process using color information and spatial frequency information of a photographed image.

Figure 14A:
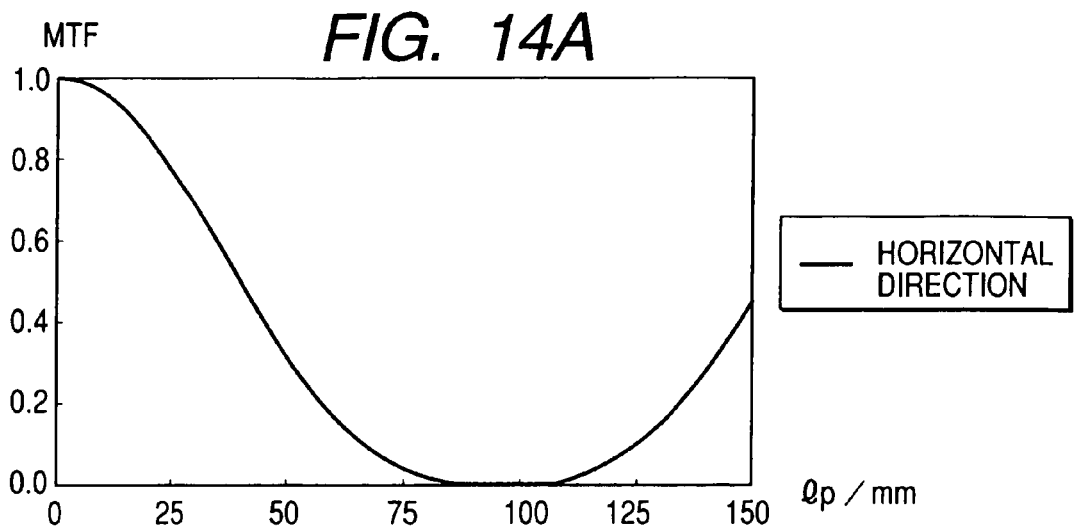
FIGS. 14A, 14B and 14C are explanatory views of the spatial frequency characteristics of the optical low-pass filter of the present invention.
Figure 14B:
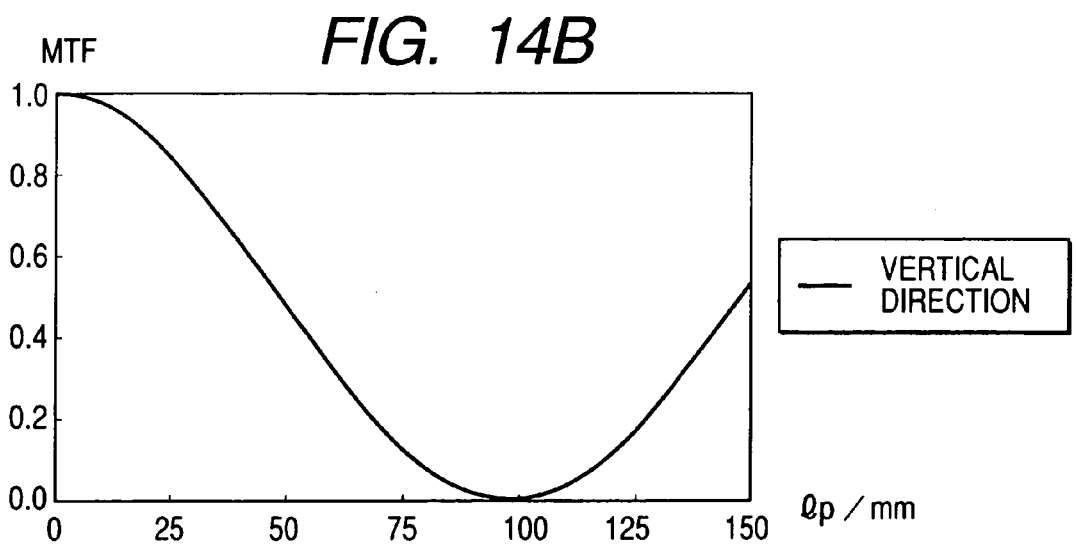
Figure 14C:
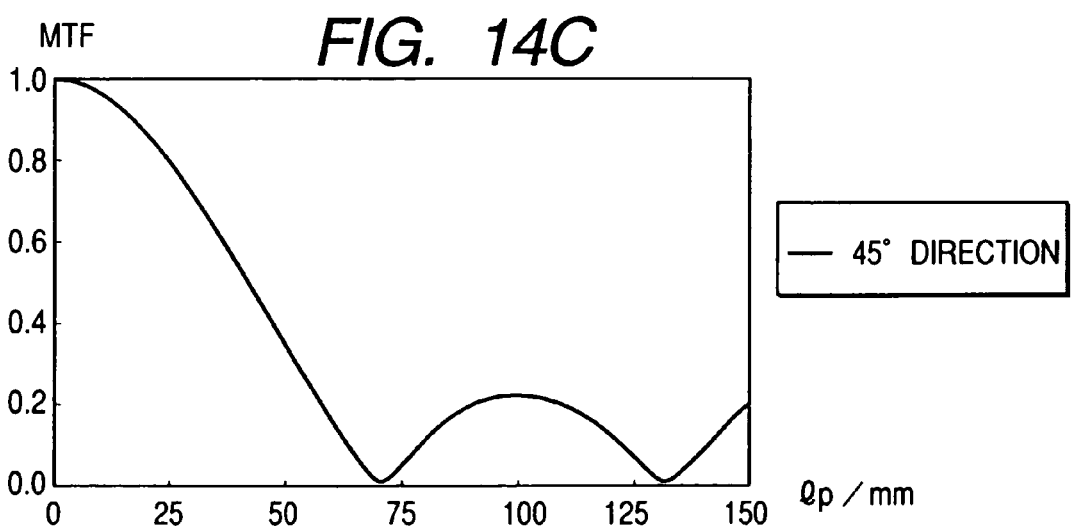

FIGS. 14A to 14C show the spatial frequency characteristics of the optical low-pass filter of this embodiment. FIGS. 14A, 14B, and 14C respectively show the characteristics in the horizontal direction (the long side direction of the image sensing element), the vertical direction (the short side direction of the image sensing element), and the oblique 45° direction.

Figure 15A:
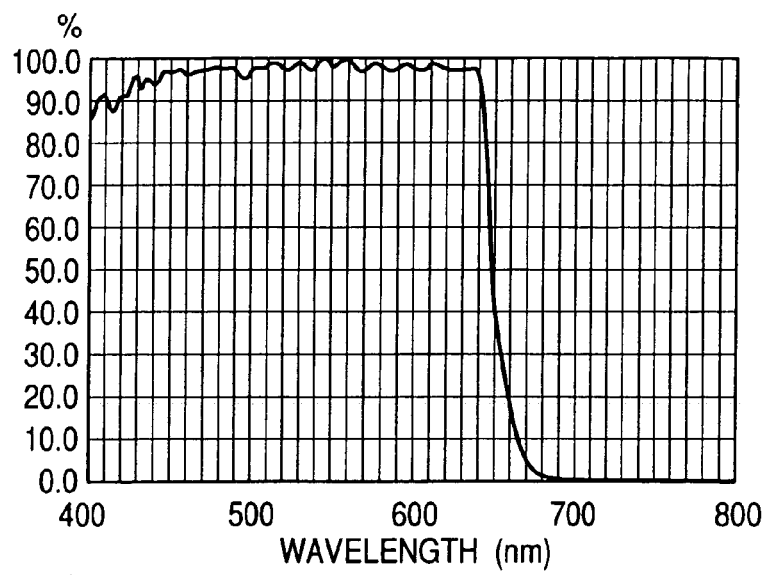
FIGS. 15A, 15B and 15C are explanatory views of the spectral characteristics of the optical low-pass filter of the present invention.

FIG. 15A shows the spectral transmittance characteristics of the overall optical low-pass filter of this embodiment. To achieve such spectral transmittance characteristics, a dielectric thin film coat which has spectral reflectance characteristics shown in FIG. 15B after adhesion is formed as an anti-reflection coat on the interface between each birefringence plate and adhesive in the optical low-pass filter of this embodiment.

Figure 15B:
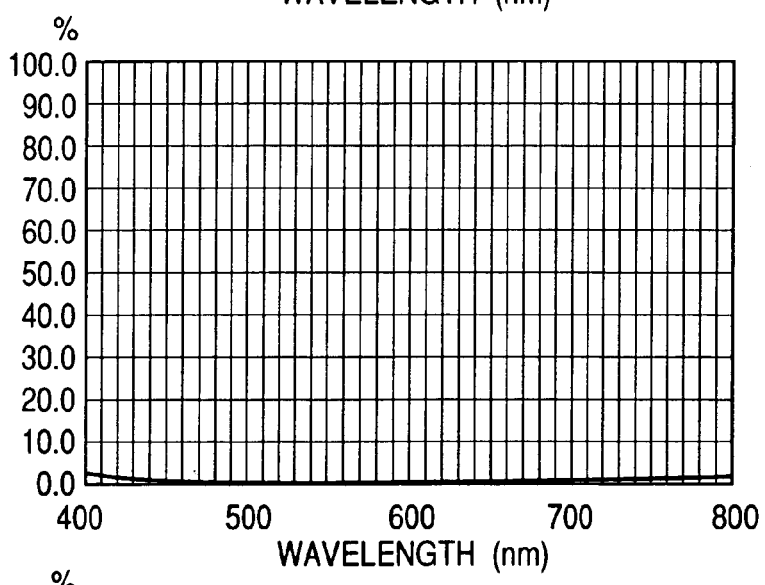

The anti-reflection coat of this embodiment realizes the characteristics shown in FIG. 15B using two dielectric layers with a small optical film thickness. Alternatively, a normal single-layered film which has an optical film thickness corresponding to ¼ the center wavelength of antreflection can be used as long as the refractive indices of the adhesive and a dielectric thin film material are appropriately selected.

Figure 15C:
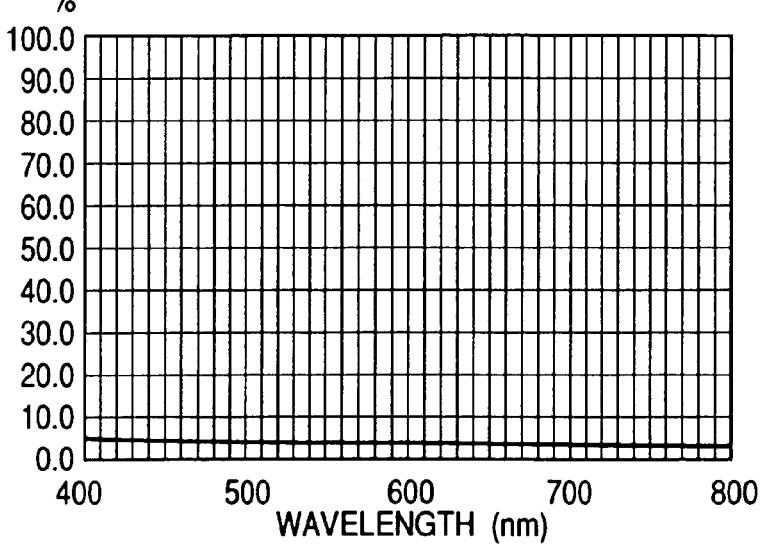

Note that this embodiment assumes a UV setting adhesive having a refractive index of around 1.56. FIG. 15C shows spectral reflectance characteristics after adhesion at an interface with an adhesive when no anti-reflection coat is formed on that interface.

As shown in FIG. 15C, in the arrangement in which light of around 4% is reflected per adhered surface of the lithium niobate birefringence plate in the visible wavelength range, the optical low-pass filter having four adhered surfaces cannot obtain spectral transmittance characteristics that assure a transmittance of 90% or higher in the visible wavelength range, as shown in FIG. 15A.

As described above, according to this embodiment, since three birefringence plates which are as sufficiently thin as 0.19 mm within a workable range are adhered so that their optic axes point to different directions, and a dielectric thin film is added to each interface including the adhered surface, an optical low-pass filter which has a visible sensitivity correction function while effectively reducing a spurious signal that adversely influences a photographed image, can reduce harmful rays that cause ghost and flare, and is suitably used in a single-lens reflex digital camera that uses exchangeable lenses prepared for a silver halide camera is realized.

Fourth Embodiment

FIGS. 16A to 16G are schematic views showing principal part of an optical low-pass filter according to the fourth embodiment of the present invention.

An optical low-pass filter 5 of this embodiment comprises three birefringence plates 151, 152, and 153 made of a lithium niobate single crystal as in the third embodiment. The optical low-pass filter 5 of this embodiment is inserted in the optical path between the photographing lens 1 and solid-state image sensing element 3 as in the image sensing system shown in FIG. 11 when it is used, and is functionally equivalent to the optical low-pass filter 5 of the third embodiment. Differences from the optical low-pass filter 5 of the third embodiment will be mainly explained below.

FIG. 16A shows the optical low-pass filter 5 viewed from the optical axis direction of the photographing lens 1, and $z3a$, $z4a$, and $z5a$ respectively represent orthogonal projections of the optic axes (Z-axes) of the birefringence plates 151, 152, and 153. As shown in FIG. 16A, in this embodiment the orthogonal projection $z3a$ of the Z-axis of the birefringence plate 151 points to a direction that makes an angle $\phi3$ with the long side of the optical low-pass filter 5, the orthogonal projection $z4a$ of the Z-axis of the birefringence plate 152 agrees with (parallel to) the long side direction of the optical low-pass filter 5, and the orthogonal projection $z5a$ of the Z-axis of the birefringence plate 153 points to a direction that makes an angle $\phi4$ with the long side of the optical low-pass filter 5. In this embodiment, $\phi3=+45°$, and $\phi4=-45°$.

The optical low-pass filter 5 in this embodiment has a size larger than the effective pixel region of the image sensing element 3 as in the optical low-pass filter of the third embodiment. Note that the long side direction of the optical low-pass filter 5 substantially agrees with that of the image sensing element.

FIG. 16B shows the optical low-pass filter 5 of this embodiment viewed from a "16B" view direction in FIG. 16A, and FIG. 16C is a partially enlarged view of FIG. 16B. In FIGS. 16B and 16C, $z3$ represents the Z-axis of the birefringence plate 151, and the Z-axis $z3$ of the birefringence plate 151 and the normal to the entrance/exit surface of the optical low-pass filter 5 make an angle $\theta3$, as shown in FIG. 16C. FIG. 16D shows the optical low-pass filter 5 of this embodiment viewed from a "16D" view direction in FIG. 16A, and FIG. 16E is a partially enlarged view of FIG. 16D. In FIGS. 16D and 16E, $z4$ represents the Z-axis of the birefringence plate 152, and the Z-axis $z4$ of the birefringence plate 152 and the normal to the entrance/exit surface of the optical low-pass filter 5 make an angle $\theta4$, as shown in FIG. 16E. FIG. 16F shows the optical low-pass filter 5 of this embodiment viewed from a "16F" view direction in FIG. 16A, and FIG. 16G is a partially enlarged view of FIG. 16F. In FIGS. 16F and 16G, $z5$ represents the Z-axis of the birefringence plate 153, and the Z-axis $z5$ of the birefringence plate 153 and the normal to the entrance/exit surface of the optical low-pass filter 5 make an angle $\theta5$, as shown in FIG. 16G. In this embodiment, $\theta3=\theta4=\theta5=45°$ to minimize the thicknesses of the individual birefringence plates. In this embodiment, thicknesses d3, d4, and d5 of the birefringence plates 151, 152, and 153 are respectively d3=0.19 mm, d4=0.14 mm, and d5=0.19 mm.

In this embodiment, since the birefringence plates 151, 152, and 153 are arranged in this way, extraordinary rays are imaged to be offset from ordinary rays by about 7.2 μm in the upper oblique 45° direction with respect to the horizontal direction, about 153 μm in the horizontal direction (long side direction), and about 7.2 μm in the lower oblique 45° direction with respect to the horizontal direction, thus separating an object image into a total of eight images, as in the third embodiment.

This embodiment is achieved under an assumption that lithium niobate which forms a birefringence plate can be worked to be sufficiently thin. Of course, the individual birefringence plates may have a larger thickness due to difficulty in thin plate work. For example, if each birefringence plate requires a thickness of 0.25 mm so as to obtain a high-precision thin plate with low-cost work, a similar optical low-pass filter can be realized by setting the angles $\theta3$, $\theta4$, and $\theta5$ the Z-axes of the individual birefringence plates respectively make with the normal to the entrance/exit surface of the optical low-pass filter to be substantially $\theta3=\theta5=64°$ and $\theta4=72°$, or substantially $\theta3=\theta5=24°$ and $\theta4=17°$.

In this manner, the thickness of the birefringence plate can be controlled in correspondence with difficulty in work by appropriately setting the angle of the optic axis of each birefringence plate. In any case, the birefringence plate can be sufficiently thinner than that in the conventional optical low-pass filter that uses quartz or the like. Especially, when an image sensing element having a small pixel pitch is used, and it becomes harder to work birefringence plates, it is effective to set the thickness of each birefringence plate to be slightly large by appropriately setting the angle of the optic axis of the birefringence plate to satisfy conditional formula (1) or (2) of the present invention. Also, in any case, it is effective to achieve anti-reflection in the visible wavelength range by adding a dielectric thin film onto the surface of each lithium niobate birefringence plate in terms of reductions of ghost and flare, as was explained in the first embodiment of the present invention.

In each embodiment of the present invention mentioned above, the separation directions of ordinary and extraordinary rays by the respective birefringence plates are not limited to the aforementioned directions. When the optical low-pass filter has a purpose of reducing a spurious color signal generated in the oblique 45° direction as in each embodiment of the present invention, the orthogonal projection of the Z-axis of the first birefringence plate may be set to point to a direction that makes an angle of +45° with the long side of the optical low pass filter, the orthogonal projection of the Z-axis of the second birefringence plate may be set to point to a direction that makes an angle of +90° with the long side of the optical low pass filter, and the orthogonal projection of the Z-axis of the third birefringence plate may be set to point to a direction that makes an angle of +135° with the long side of the optical low pass filter.

Other Embodiments

Figure 8:
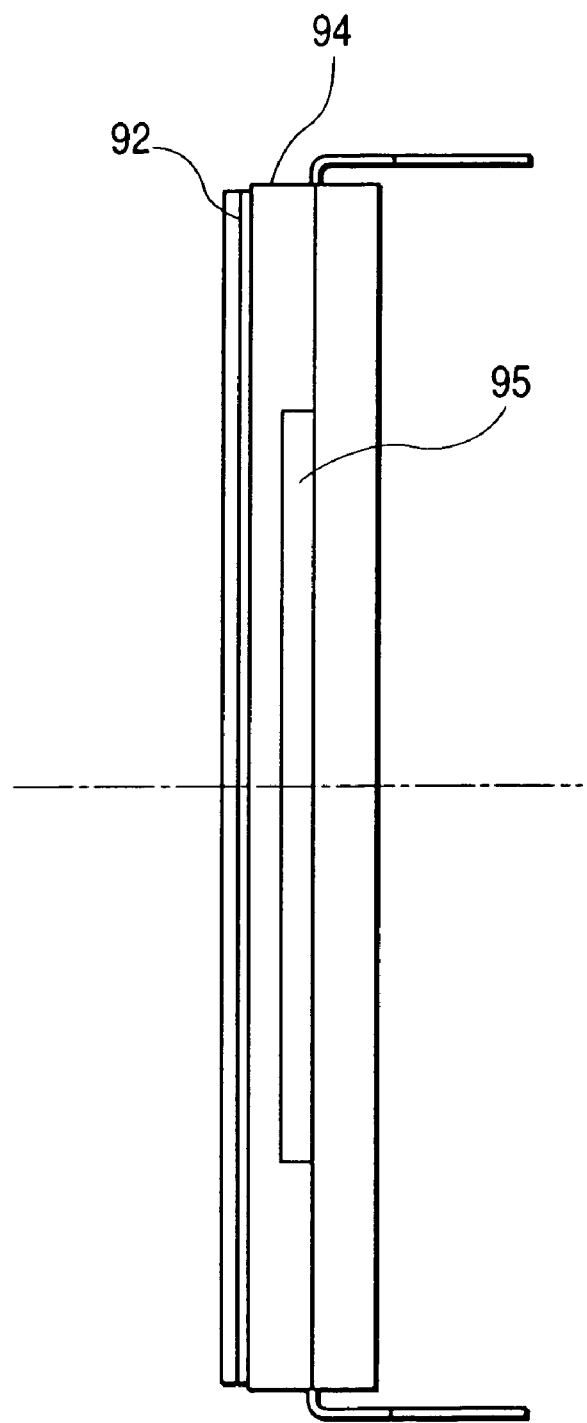
FIG. 8 is an explanatory view of an image sensing unit which comprises an optical low-pass filter as a protection plate.

An embodiment which uses the optical low-pass filter in the above embodiment as a projection plate of a solid-state image sensing element will be explained below using FIG. 8. In FIG. 8, 92 indicates an optical low-pass filter explained in the first or second embodiment, 94 indicates a package, and 95 indicates an image sensing portion. The image sensing element shown in FIG. 8 is of the type in which an image sensing portion 94 comprising a two-dimensional solid-state image sensing element such as a CCD, MOS, or the like is encapsulated in a package 95, which is covered by a transparent plane-parallel plate. In the embodiment shown in FIG. 8, the optical low-pass filter is applied to this transparent plane-parallel plate, and serves as a protection plate.

Normally, inexpensive sheet glass is used as a plane-parallel plate serving as a protection plate. However, the presence of a plane-parallel plate in the optical path is not desirable in terms of both space factor and optical performance of the photographing optical system for the aforementioned reasons. Hence, in the embodiment shown in FIG. 8, an optical low-pass filter which is nearly indispensable in the optical system using the image sensing element is used as a protection plate of the image sensing portion to eliminate plane-parallel plates inserted in the optical path as much as possible.

Figure 9:
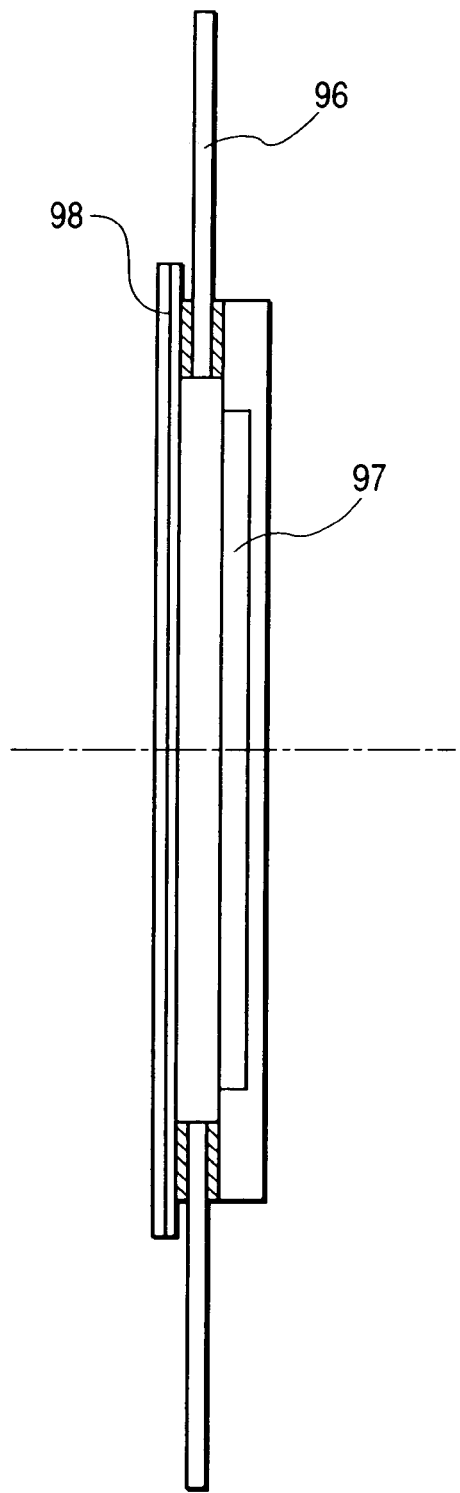
FIG. 9 is an explanatory view of another image sensing unit which comprises an optical low-pass filter as a protection plate.
Figure 10A:
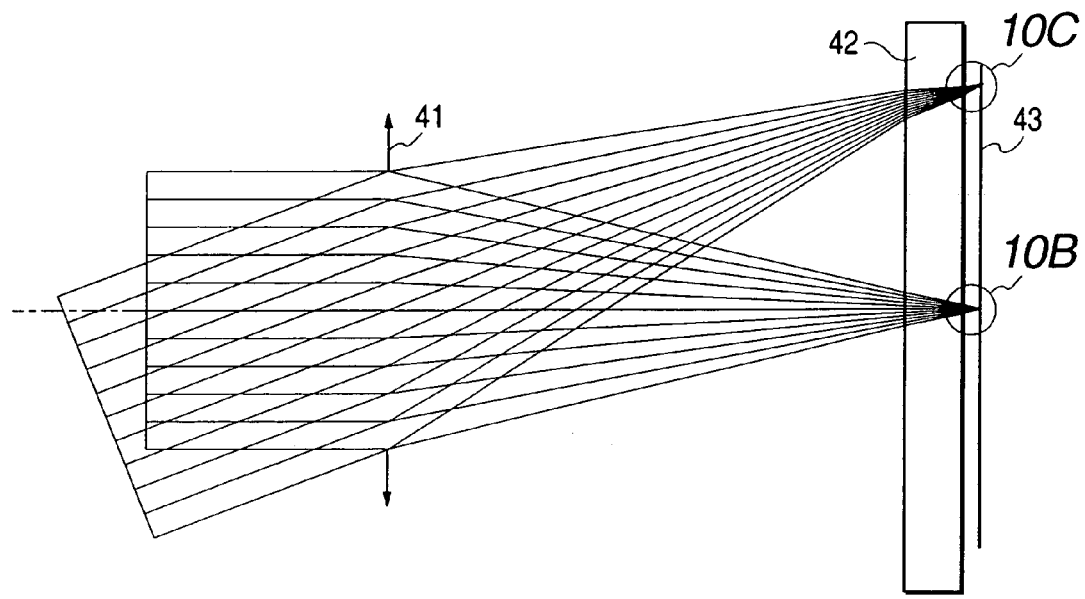
FIGS. 10A, 10B and 10C are explanatory views of ray aberrations produced in a plane-parallel plate.
Figure 10B:
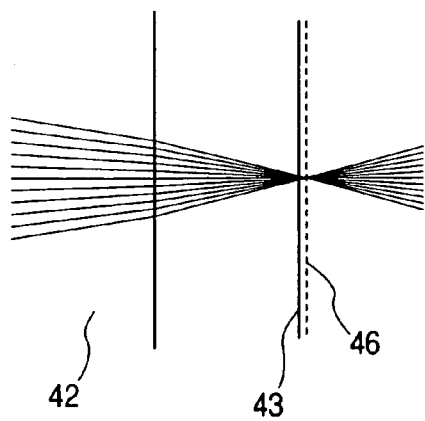
Figure 10C:
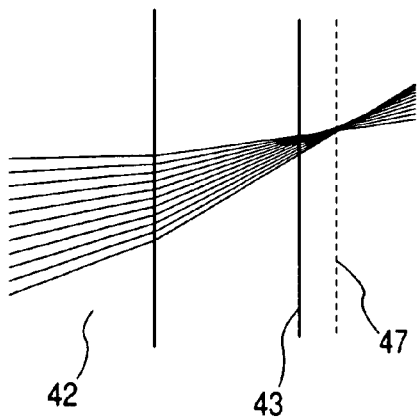

FIG. 9 shows an embodiment different from FIG. 8, in which the optical low-pass filter in the above embodiment is used as a protection plate of a solid-state image sensing element. In this embodiment, an image sensing portion is mounted on a board to achieve a low-profile image sensing unit. The image sensing element shown in FIG. 9 has an arrangement in which an image sensing portion 97 and an optical low-pass filter 98 serving as a protection plate are adhered to the two surfaces of a board 96, thus satisfactorily achieving the object of this embodiment, i.e., a low-profile image sensing unit.

In the embodiments of the solid-state image sensing elements shown in FIGS. 8 and 9, the optical low-pass filter serving as a protection plate is not in direct contact with the image sensing portion. Alternatively, in order to achieve a further size reduction, the optical low-pass filter may be directly adhered to the image sensing portion.

The aforementioned embodiments have been explained assuming a lithium niobate single crystal as a uniaxial single crystal material used in a birefringence plate of an optical low-pass filter. Alternatively, other uniaxial single crystals, e.g., a single crystal of rutile and the like may be used as long as that uniaxial single crystal has a larger refractive index difference between ordinary and extraordinary rays than quartz.

What is claimed is:

1. An optical low-pass filter comprising:
at least one birefringent plate made of a uniaxial single crystal having a refractive index difference of not less than 0.02 for ordinary and extraordinary rays,
wherein said filter satisfies one of:

$$10° < \theta < 27° \quad (1)$$

$$61° < \theta < 80° \quad (2)$$

where θ is the angle an optic axis of said at least one birefringent plate makes with a normal to a surface of said at least one birefringent plate.

2. A filter according to claim 1, wherein said at least one birefringent plate is made of lithium niobate.

3. A filter according to claim 1, wherein said at least one birefringent plate comprises:
a first birefringent plate made of a uniaxial single crystal; and
a second birefringent plate made of a uniaxial single crystal,
wherein an orthogonal projection of an optic axis of said first birefringent plate onto an entrance or exit surface of said filter and an orthogonal projection of an optic axis of said second birefringent plate onto the entrance or exit surface point in different directions.

4. A filter according to claim 3, wherein the orthogonal projection of the optic axis of said first birefringent plate onto the entrance or exit surface and the orthogonal projection of the optic axis of said second birefringent plate onto the entrance or exit surface make a substantially 45° angle.

5. A filter according to claim 1, further comprising:
a plurality of plane-parallel plates including said at least one birefringent plate,
wherein when said plurality of plane-parallel plates are adhered via an adhesive, a dielectric thin film having an anti-reflection effect of rays in a visible wavelength range at an interface between the adhesive and said birefringent plate is added to the surface of said birefringent plate.

6. An image sensing unit comprising:
an image sensing element; and
an optical low-pass filter of claim 1, which is inserted in an optical path of photographing light guided to said image sensing element, and causes birefringence of the photographing light.

7. A unit according to claim 6, wherein said image sensing element and said optical low-pass filter are integrated.

8. A unit according to claim 6, wherein said optical low-pass filter unit is adhered to a front surface of a package that encapsulates said image sensing element.

9. A unit according to claim 6, wherein said optical low-pass filter is adhered to a front surface of a board on which said image sensing element is mounted and encapsulates said image sensing element.

10. A unit according to claim 6, wherein said optical low-pass filter is directly adhered to said image sensing element.

11. A unit according to claim 6, wherein said image sensing element has a rectangular image sensing surface, and an orthogonal projection of an optic axis of one of said at least one birefringent plate onto an entrance or exit surface of said filter is substantially parallel to a long side of the image sensing surface.

12. A unit according to claim 6, wherein said at least one birefringent plate of said optical low-pass filter comprises:
a first birefringent plate made of a uniaxial single crystal; and
a second birefringent plate made of a uniaxial single crystal,
wherein an orthogonal projection of an optic axis of said first birefringent plate onto an entrance or exit surface of the birefringent plate and an orthogonal projection of an optic axis of said second birefringent plate onto the entrance or exit surface of the birefringent plate make a substantially 45° angle.

13. A unit according to claim 12, wherein said image sensing element has a rectangular image sensing surface, and
the orthogonal projection of the optic axis of said first birefringent plate onto the entrance or exit surface of the birefringent plate is substantially parallel to a long side of the image sensing surface, and the orthogonal projection of the optic axis of said second birefringent plate onto the entrance or exit surface of the birefringent plate makes a substantially 45° angle with the long side of the image sensing surface.

14. An image sensing apparatus comprising:
an image sensing unit of claim 6; and
an image sensing optical system for guiding photographing light to said image sensing unit.

15. An apparatus according to claim 14, further comprising a detachable mount.

16. An image sensing unit comprising:
an image sensing element having a rectangular image sensing surface; and
at least one birefringent plate which is inserted in an optical path of photographing light guided to said image sensing element, made of a uniaxial single crystal having a refractive index difference of not less than 0.02 for ordinary and extraordinary rays,
wherein said unit satisfies:

$$0.015 < p/d < 0.045 \quad (3)$$

where d is the thickness of said at least one birefringent plate, and p is the pixel pitch of the image sensing surface in a long side direction, and
wherein said unit satisfies one of:

$$10° < \theta < 27° \quad (1)$$

$$61° < \theta < 80° \quad (2)$$

where θ is the angle an optic axis of the uniaxial single crystal of said at least one birefringent plate makes with a normal to a surface of said at least one birefringent plate.

17. A unit according to claim 16, wherein said at least one birefringent plate comprises:
a first birefringent plate made of a uniaxial single crystal; and
a second birefringent plate made of a uniaxial single crystal,
wherein an orthogonal projection of an optic axis of said first birefringent plate onto an entrance or exit surface of said unit and an orthogonal projection of an optic axis of said second birefringent plate onto the entrance or exit surface of said unit make a substantially 45° angle.

18. A unit according to claim 17, wherein the orthogonal projection of the optic axis of said first birefringent plate onto the entrance or exit surface is substantially parallel to a long side of the image sensing surface, and the orthogonal projection of the optic axis of said second birefringent plate onto the entrance or exit surface makes a substantially 45° angle with the long side direction of the image sensing surface.

19. A unit according to claim 16, wherein the uniaxial single crystal of said birefringent plate is a single crystal of lithium niobate.

20. An image sensing apparatus comprising:
an image sensing unit of claim 16; and
an image sensing optical system for guiding photographing light from an object to said image sensing unit.

21. An optical low-pass filter comprising:
a first birefringent plate made of a single crystal of lithium niobate; and
a second birefringent plate made of a single crystal of lithium niobate,
wherein an orthogonal projection of an optic axis of said first birefringent plate onto an entrance or exit surface of said filter and an orthogonal projection of an optic axis of said second birefringent plate onto the entrance or exit surface of said filter point in different directions, and all the birefringent plates of said optical low-pass filter are made of a single crystal of lithium niobate, and
wherein said filter satisfies one of:

$$10° < \theta o < 27°$$

$$61° < \theta o < 80°$$

where θo is the angle an optic axis of at least one of said first and second birefringent plates makes with a normal to an entrance or exit surface of the birefringent plate.

22. A filter according to claim 21, wherein the orthogonal projection of the optic axis of said first birefringent plate onto the entrance or exit surface and the orthogonal projection of the optic axis of said second birefringent plate onto the entrance or exit surface make a substantially 45° angle.

23. A filter according to claim 21, wherein when said first and second birefringent plates are adhered, a dielectric thin film having an anti-reflection effect of rays in a visible wavelength range at an interface between the adhesive and each birefringent plate is added to a surface of the birefringent plate.

24. A filter according to claim 21, further comprising:
a third birefringent plate made of a single crystal of lithium niobate,
wherein the orthogonal projection of the optic axis of said first birefringent plate onto the entrance or exit surface and the orthogonal projection of the optic axis of said second birefringent plate onto the entrance or exit surface make substantially 45°, and the orthogonal projection of the optic axis of said first birefringent plate onto the entrance or exit surface and an orthogonal projection of an optic axis of said third birefringent plate onto the entrance or exit surface make substantially 90°.

25. A filter according to claim 24, wherein said first, second, and third birefringent plates are arranged in turn from a light entrance side, and said filter satisfies:

$$D1 \approx D3 > 2$$

where D1, D2, and D3 are respectively the separation distances of said first, second, and third birefringent plates at exit surfaces thereof.

26. A filter according to claim 25, wherein said filter satisfies one of:

$$10° < \theta 2 < 27°$$

$$61° < \theta 2 < 80°$$

where θ2 is the angle the optic axis of said second birefringent plate makes with a normal to an entrance or exit surface of a plane-parallel plate.

27. An image sensing unit comprising:
an image sensing element; and
an optical low-pass filter of claim 21, which is inserted in an optical path of photographing light guided to said image sensing element.

28. A unit according to claim 27, wherein said image sensing element has a rectangular image sensing surface, and an orthogonal projection of an optic axis of one of the plurality of birefringent plates onto an entrance or exit surface is substantially parallel to a long side of the image sensing surface.

29. A unit according to claim 27, wherein an orthogonal projection of an optic axis of said first birefringent plate onto an entrance or exit surface and an orthogonal projection of an optic axis of said second birefringent plate onto the entrance or exit surface make a substantially 45° angle.

30. A unit according to claim 29, wherein said image sensing element has a rectangular image sensing surface, and an optic axis of one of said first and second birefringent plates is substantially parallel to a long side of the image sensing surface.

31. A unit according to claim 30, wherein an orthogonal projection of an optic axis of a single crystal of the first birefringent plate makes an angle of substantially 45° with a long side direction of the image sensing surface; and
said unit further comprising a third birefringent plate made of a single crystal of lithium niobate, wherein the orthogonal projection of the optic axis of said first birefringent plate onto the entrance or exit surface and the orthogonal projection of the optic axis of said second birefringent plate onto the entrance or exit surface make substantially 45°, and the orthogonal projection of the optic axis of said first birefringent plate onto the entrance or exit surface and an orthogonal projection of an optic axis of said third birefringent plate onto the entrance or exit surface make substantially 90°.

32. A unit according to claim 31, wherein said unit satisfies:

$$D1 \approx D3 > 2$$

where D1, D2, and D3 are respectively the separation distances of the first, second, and third birefringent plates at exit surfaces thereof.

33. A unit according to claim 32, wherein said first, second, and third birefringent plates are arranged in turn from a light entrance side, and said unit satisfies one of:

$$10° < \theta 2 < 27°$$

$$61° < \theta 2 < 80°$$

where θ2 is the angle the optic axis of said second birefringent plate makes with a normal to an entrance or exit surface of a plane-parallel plate.

34. A unit according to claim 27, wherein said image sensing element and said optical low-pass filter are integrated.

35. A unit according to claim 27, wherein said optical low-pass filter unit are adhered to a front surface of a package that encapsulates said image sensing element.

36. A unit according to claim 27, wherein said optical low-pass filter is adhered to a front surface of a board on which said image sensing element is mounted and encapsulates said image sensing element.

37. A unit according to claim 27, wherein said optical low-pass filter is directly adhered to said image sensing element.

38. An image sensing apparatus comprising:
an image sensing unit of claim 27; and
an image sensing optical system for guiding photographing light from an object to said image sensing unit.

* * * * *

UNITED STATES PATENT AND TRADEMARK OFFICE
CERTIFICATE OF CORRECTION

PATENT NO. : 6,963,448 B1
APPLICATION NO. : 09/714266
DATED : November 8, 2005
INVENTOR(S) : Shingo Hayakawa It is certified that error appears in the above-identified patent and that said Letters Patent is hereby corrected as shown below:

Title page,
Item [56], References Cited, OTHER PUBLICATIONS,
"Using" should read -- Use --.

Column 1,
Line 49, "utilizes" should read -- utilize --.

Column 9,
Line 58, "two" should read -- two --.

Column 11,
Line 41, " $D2 \leq P/\sqrt{2}$ " should read -- $D2 \leq P/2$ --.

Column 15,
Line 28, "shows" should read -- show --;
Line 59, "optical imaged" should read -- optical low-pass filter 2 of the first embodiment. Note that the long side direction of the optical low-pass filter 102 substantially agrees with that of the image sensing element.
 Fig. 7B shows the optical low-pass filter 102 of this embodiment viewed from a "7B" view direction in Fig. 7A, and Fig. 7C is a partially enlarged view of Fig. 7B. In Figs. 7B and 7C, z1 represents the z-axis of the birefringence plate 121, and the z-axis z1 of the birefringence plate 121 and the normal to the entrance/exit surface of the optical low-pass filter 102 make an angle $\theta 1$, as shown in Fig. 7C. In this embodiment, $\theta 1 = 15°$. Fig. 7D shows the optical low-pass filter 102 of this embodiment viewed from a "7D" view direction in Fig. 7A, and Fig. 7E is a partially enlarged view of Fig. 7D. In Figs. 7D and 7E, z2 represents the z-axis of the birefringence plate 122, and the z-axis z2 of the birefringence plate 122 and the normal to the entrance/exit surface of the optical low-pass filter 102 make an angle $\theta 2$, as shown in Fig. 7E. In this embodiment, $\theta 2 = 35°$. Furthermore, thicknesses d1 and d2 of the birefringence plates 121 and 122 are respectively d1 = 0.30 mm and d2 = 0.30 mm.
 In the optical low-pass filter 102 of this embodiment, since the birefringence plates 121 and 122 are arranged in this manner, extraordinary rays are imaged. --; and Line 63, "angle e" should read -- angle $\theta$ --.

UNITED STATES PATENT AND TRADEMARK OFFICE
CERTIFICATE OF CORRECTION

PATENT NO. : 6,963,448 B1
APPLICATION NO. : 09/714266
DATED : November 8, 2005
INVENTOR(S) : Shingo Hayakawa It is certified that error appears in the above-identified patent and that said Letters Patent is hereby corrected as shown below:

Column 16,
Lines 19-41, should be deleted; and
Line 42, "this manner, extraordinary rays are" should be deleted.

Column 19,
Line 9, "ant-" should read -- anti- --.

Column 24,
Line 63, "D1≅D3>2" should read -- D1=D3>D2 --.

Column 25,
Line 34, "comprising" should read -- comprises --.

Column 26,
Line 8, "D1≅D3>2" should read -- D1=D3>D2 --.
Line 26, "are" should read -- is --.

Signed and Sealed this

Eighteenth Day of July, 2006

JON W. DUDAS
*Director of the United States Patent and Trademark Office*